United States Patent
Patmore et al.

(10) Patent No.: US 11,139,666 B2
(45) Date of Patent: Oct. 5, 2021

(54) ENERGY HARVESTING AND PROPULSION ASSISTANCE TECHNIQUES FOR A PATIENT SUPPORT APPARATUS

(71) Applicant: Stryker Corporation, Kalamazoo, MI (US)

(72) Inventors: Kevin M. Patmore, Portage, MI (US); Martin W. Stryker, Kalamazoo, MI (US); Jeffrey S. Dunfee, II, Kalamazoo, MI (US); Daniel V. Brosnan, Kalamazoo, MI (US); Krishna S. Bhimavarapu, Kalamazoo, MI (US); Aaron D. Furman, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 228 days.

(21) Appl. No.: 16/168,212

(22) Filed: Oct. 23, 2018

(65) Prior Publication Data
US 2019/0125602 A1 May 2, 2019

Related U.S. Application Data

(60) Provisional application No. 62/576,303, filed on Oct. 24, 2017.

(51) Int. Cl.
*H02J 7/00* (2006.01)
*A61G 7/018* (2006.01)
(Continued)

(52) U.S. Cl.
CPC ............ *H02J 7/0063* (2013.01); *A61G 7/005* (2013.01); *A61G 7/012* (2013.01); *A61G 7/018* (2013.01);
(Continued)

(58) Field of Classification Search
CPC ...... A61G 7/018; A61G 7/005; A61G 7/0527; A61G 7/012; A61G 7/1046; H02J 5/005; H02J 50/90; H02J 50/10; H02J 50/12
See application file for complete search history.

(56) References Cited

U.S. PATENT DOCUMENTS 3,644,945 A 2/1972 Goodman et al.
3,743,905 A 7/1973 Goodman et al.
(Continued)

FOREIGN PATENT DOCUMENTS

AU 2008316723 A1 4/2009
CA 2187727 A1 4/1997
(Continued)

OTHER PUBLICATIONS

Colson Group USA, "EZ Wheel Brochure", 2017, 4 pages.
(Continued)

*Primary Examiner* — Carlos Amaya
(74) *Attorney, Agent, or Firm* — Howard & Howard Attorneys PLLC

(57) ABSTRACT

Energy harvesting and propulsion assistance techniques for a patient support apparatus are provided. The patient support apparatus comprises a base, a patient support surface supported by the base, and a powered device (e.g., propulsion device). An energy harvest and release system includes a harvesting device for harvesting energy, a storage device for storing and releasing the harvested energy, and a controller coupled to the harvesting device, the storage device, and the powered device. The controller is automated to selectively instruct the harvesting device to harvest energy and to selectively instruct release of the harvested energy from the storage device for consumption by the powered device (e.g., to assist in movement of the patient support apparatus).

20 Claims, 10 Drawing Sheets

(51) Int. Cl.
*A61G 7/005* (2006.01)
*A61G 7/05* (2006.01)
*A61G 7/012* (2006.01)
*H02J 9/00* (2006.01)
*A61G 7/10* (2006.01)

(52) U.S. Cl.
CPC .............. *A61G 7/0527* (2016.11); *H02J 9/00* (2013.01); *A61G 7/1046* (2013.01)

(56) References Cited

U.S. PATENT DOCUMENTS

| | | | |
|---|---|---|---|
| 3,763,979 A | 10/1973 | Goodman et al. | |
| 4,095,822 A | 6/1978 | Thornhill | |
| 4,944,056 A | 7/1990 | Schroeder et al. | |
| 4,961,422 A | 10/1990 | Marchosky et al. | |
| 5,094,314 A * | 3/1992 | Hayata | A61G 3/065 180/217 |
| 5,164,623 A | 11/1992 | Shkondin | |
| 5,197,466 A | 3/1993 | Marchosky et al. | |
| 5,591,217 A | 1/1997 | Barreras | |
| 5,697,110 A | 12/1997 | Campbell | |
| 5,708,993 A | 1/1998 | Campbell et al. | |
| 5,769,877 A | 6/1998 | Barreras, Sr. | |
| 5,806,110 A | 9/1998 | Kunz et al. | |
| 5,806,111 A | 9/1998 | Heimbrock et al. | |
| 5,807,397 A | 9/1998 | Barreras | |
| 5,821,728 A | 10/1998 | Schwind | |
| 5,991,665 A | 11/1999 | Wang et al. | |
| 6,460,828 B1 | 10/2002 | Gersemsky et al. | |
| 6,532,607 B1 | 3/2003 | Heil | |
| 6,802,385 B2 | 10/2004 | Pyntikov et al. | |
| 6,838,174 B2 | 1/2005 | Nakahigashi | |
| 6,870,475 B2 | 3/2005 | Fitch et al. | |
| 6,871,714 B2 | 3/2005 | Johnson | |
| 6,966,083 B1 | 11/2005 | Cheng | |
| 7,010,369 B2 | 3/2006 | Borders et al. | |
| 7,154,397 B2 | 12/2006 | Zerhusen et al. | |
| 7,256,705 B2 | 8/2007 | Kagermeier et al. | |
| 7,321,811 B1 | 1/2008 | Rawls-Meehan | |
| 7,398,571 B2 | 7/2008 | Souke et al. | |
| 7,404,221 B2 | 7/2008 | Sackner | |
| 7,465,280 B2 | 12/2008 | Rawls-Meehan | |
| 7,528,521 B2 | 5/2009 | Naitou et al. | |
| 7,530,616 B2 | 5/2009 | Pomper | |
| 7,650,192 B2 | 1/2010 | Wahlstrand | |
| 7,679,520 B2 | 3/2010 | Zerhusen et al. | |
| 7,725,968 B2 | 6/2010 | Lambarth | |
| 7,825,544 B2 | 11/2010 | Jansen et al. | |
| 7,868,740 B2 | 1/2011 | McNeely et al. | |
| 7,887,113 B2 | 2/2011 | Lambarth et al. | |
| 7,911,349 B2 | 3/2011 | Zerhusen et al. | |
| 8,000,800 B2 | 8/2011 | Takeda et al. | |
| 8,006,332 B2 | 8/2011 | Lemire et al. | |
| 8,019,486 B2 | 9/2011 | Rawls-Meehan | |
| 8,031,057 B2 | 10/2011 | McNeely et al. | |
| 8,032,263 B2 | 10/2011 | Rawls-Meehan | |
| 8,035,255 B2 | 10/2011 | Kurs et al. | |
| 8,046,115 B2 | 10/2011 | Rawls-Meehan | |
| 8,046,116 B2 | 10/2011 | Rawls-Meehan | |
| 8,046,117 B2 | 10/2011 | Rawls-Meehan | |
| 8,056,163 B2 | 11/2011 | Lemire et al. | |
| 8,056,950 B2 | 11/2011 | Souke et al. | |
| 8,063,785 B2 | 11/2011 | Sacchetti | |
| 8,069,512 B2 | 12/2011 | Rawls-Meehan | |
| 8,078,336 B2 | 12/2011 | Rawls-Meehan | |
| 8,078,337 B2 | 12/2011 | Rawls-Meehan | |
| 8,106,539 B2 | 1/2012 | Schatz et al. | |
| 8,121,856 B2 | 2/2012 | Huster et al. | |
| 8,125,318 B2 | 2/2012 | Heimbrock et al. | |
| 8,129,865 B2 | 3/2012 | Krumme et al. | |
| 8,143,846 B2 | 3/2012 | Herman et al. | |
| 8,177,274 B2 | 5/2012 | Pomper | |
| 8,285,388 B2 | 10/2012 | Wahlstrand | |
| 8,295,940 B2 | 10/2012 | Sherman | |
| 8,304,935 B2 | 11/2012 | Karalis et al. | |
| 8,324,759 B2 | 12/2012 | Karalis et al. | |
| 8,334,779 B2 | 12/2012 | Zerhusen et al. | |
| 8,344,860 B2 | 1/2013 | Collins, Jr. et al. | |
| 8,362,742 B2 | 1/2013 | Kallmyer | |
| 8,368,545 B2 | 2/2013 | Zerhusen et al. | |
| 8,375,488 B2 | 2/2013 | Rawls-Meehan | |
| 8,400,017 B2 | 3/2013 | Kurs et al. | |
| 8,400,104 B2 | 3/2013 | Adamczyk et al. | |
| 8,410,636 B2 | 4/2013 | Kurs et al. | |
| 8,439,416 B2 | 5/2013 | Lambarth et al. | |
| 8,441,154 B2 | 5/2013 | Karalis et al. | |
| 8,447,366 B2 | 5/2013 | Ungari et al. | |
| 8,461,719 B2 | 6/2013 | Kesler et al. | |
| 8,461,720 B2 | 6/2013 | Kurs et al. | |
| 8,461,721 B2 | 6/2013 | Karalis et al. | |
| 8,461,722 B2 | 6/2013 | Kurs et al. | |
| 8,466,583 B2 | 6/2013 | Karalis et al. | |
| 8,471,410 B2 | 6/2013 | Karalis et al. | |
| 8,476,788 B2 | 7/2013 | Karalis et al. | |
| 8,482,158 B2 | 7/2013 | Kurs et al. | |
| 8,487,480 B1 | 7/2013 | Kesler et al. | |
| 8,497,601 B2 | 7/2013 | Hall et al. | |
| 8,499,384 B2 | 8/2013 | Zerhusen | |
| 8,536,990 B2 | 9/2013 | Collins, Jr. et al. | |
| 8,551,163 B2 | 10/2013 | Aber et al. | |
| 8,554,322 B2 | 10/2013 | Olson et al. | |
| 8,565,934 B2 | 10/2013 | Rawls-Meehan | |
| 8,569,914 B2 | 10/2013 | Karalis et al. | |
| 8,587,153 B2 | 11/2013 | Schatz et al. | |
| 8,587,155 B2 | 11/2013 | Giler et al. | |
| 8,604,916 B2 | 12/2013 | McNeely et al. | |
| 8,604,917 B2 | 12/2013 | Collins et al. | |
| 8,606,344 B2 | 12/2013 | DiMaio et al. | |
| 8,618,696 B2 | 12/2013 | Kurs et al. | |
| 8,626,249 B2 | 1/2014 | Ungari et al. | |
| 8,629,578 B2 | 1/2014 | Kurs et al. | |
| 8,634,981 B1 | 1/2014 | Hyde et al. | |
| 8,641,629 B2 | 2/2014 | Kurokawa | |
| 8,669,676 B2 | 3/2014 | Karalis et al. | |
| 8,674,839 B2 | 3/2014 | Zerhusen et al. | |
| 8,686,598 B2 | 4/2014 | Schatz et al. | |
| 8,692,410 B2 | 4/2014 | Schatz et al. | |
| 8,716,903 B2 | 5/2014 | Kurs et al. | |
| 8,723,366 B2 | 5/2014 | Fiorello et al. | |
| 8,725,262 B2 | 5/2014 | Olson et al. | |
| 8,729,737 B2 | 5/2014 | Schatz et al. | |
| 8,764,621 B2 | 7/2014 | Badstibner et al. | |
| 8,772,973 B2 | 7/2014 | Kurs | |
| 8,782,826 B2 | 7/2014 | White et al. | |
| 8,799,011 B2 | 8/2014 | Wilson et al. | |
| 8,847,548 B2 | 9/2014 | Kesler et al. | |
| 8,862,241 B2 | 10/2014 | Forsell | |
| 8,864,205 B2 | 10/2014 | Lemire et al. | |
| 8,866,598 B2 | 10/2014 | Collins, Jr. et al. | |
| 8,869,328 B2 | 10/2014 | Rawls-Meehan | |
| 8,881,852 B2 * | 11/2014 | Kim | A61H 3/04 180/65.1 |
| 8,886,333 B2 | 11/2014 | Lui et al. | |
| 8,886,383 B2 | 11/2014 | Hyde et al. | |
| 8,887,619 B2 | 11/2014 | Kallmyer et al. | |
| 8,890,470 B2 | 11/2014 | Partovi | |
| 8,896,264 B2 | 11/2014 | Partovi | |
| 8,901,778 B2 | 12/2014 | Kesler et al. | |
| 8,901,779 B2 | 12/2014 | Kesler et al. | |
| 8,901,881 B2 | 12/2014 | Partovi | |
| 8,907,531 B2 | 12/2014 | Hall et al. | |
| 8,909,378 B2 | 12/2014 | Rawls-Meehan | |
| 8,912,687 B2 | 12/2014 | Kesler et al. | |
| 8,917,166 B2 | 12/2014 | Collins, Jr. et al. | |
| 8,928,276 B2 | 1/2015 | Kesler et al. | |
| 8,933,594 B2 | 1/2015 | Kurs et al. | |
| 8,937,408 B2 | 1/2015 | Ganem et al. | |
| 8,946,938 B2 | 2/2015 | Kesler et al. | |
| 8,963,488 B2 | 2/2015 | Campanella et al. | |
| 8,973,963 B2 | 3/2015 | Lambarth et al. | |
| 8,984,685 B2 | 3/2015 | Robertson et al. | |
| 9,002,469 B2 | 4/2015 | D'Ambrosio | |
| 9,038,218 B1 | 5/2015 | Heil et al. | |

(56) References Cited

U.S. PATENT DOCUMENTS

| | | |
|---|---|---|
| 9,044,365 B2 | 6/2015 | Rawls-Meehan |
| 9,044,366 B2 | 6/2015 | Rawls-Meehan |
| 9,050,031 B2 | 6/2015 | Collins, Jr. et al. |
| 9,052,718 B2 | 6/2015 | Hyde et al. |
| 9,059,599 B2 | 6/2015 | Won et al. |
| 9,079,043 B2 | 7/2015 | Stark et al. |
| 9,089,462 B1 | 7/2015 | Lafleche |
| 9,093,853 B2 | 7/2015 | Schatz et al. |
| 9,101,521 B2 | 8/2015 | White et al. |
| 9,105,959 B2 | 8/2015 | Kesler et al. |
| 9,106,203 B2 | 8/2015 | Kesler et al. |
| 9,107,783 B2 | 8/2015 | Childs et al. |
| 9,108,063 B2 | 8/2015 | Olson et al. |
| 9,114,050 B2 | 8/2015 | White et al. |
| 9,125,779 B2 | 9/2015 | Hyde et al. |
| 9,132,051 B2 | 9/2015 | Heil |
| 9,149,126 B2 | 10/2015 | Rawls-Meehan |
| 9,160,203 B2 | 10/2015 | Fiorello et al. |
| 9,161,633 B2 | 10/2015 | Rawls-Meehan |
| 9,173,793 B2 | 11/2015 | Rawls-Meehan |
| 9,173,794 B2 | 11/2015 | Rawls-Meehan |
| 9,182,750 B2 | 11/2015 | Rawls-Meehan |
| 9,184,595 B2 | 11/2015 | Kurs et al. |
| 9,218,454 B2 | 12/2015 | Kiani et al. |
| 9,220,651 B2 | 12/2015 | Hyde et al. |
| 9,233,039 B2 | 1/2016 | Hyde et al. |
| 9,237,814 B2 | 1/2016 | Rawls-Meehan |
| 9,241,858 B2 | 1/2016 | Hyde et al. |
| 9,246,336 B2 | 1/2016 | Kurs et al. |
| 9,259,369 B2 | 2/2016 | Derenne et al. |
| 9,270,134 B2 | 2/2016 | Gaddam et al. |
| 9,278,036 B2 | 3/2016 | Lee |
| 9,281,701 B2 | 3/2016 | Large et al. |
| 9,286,441 B2 | 3/2016 | Zerhusen et al. |
| 9,289,336 B2 | 3/2016 | Lambarth et al. |
| 9,295,849 B2 | 3/2016 | Elghazzawi et al. |
| 9,306,322 B2 | 4/2016 | Bhimavarapu et al. |
| 9,308,303 B2 | 4/2016 | Badstibner et al. |
| 9,314,105 B2 | 4/2016 | Ralws-Meehan |
| 9,314,928 B2 | 4/2016 | Hyde et al. |
| 9,314,929 B2 | 4/2016 | Hyde et al. |
| 9,333,136 B2 | 5/2016 | Gibson et al. |
| 9,336,672 B2 | 5/2016 | Collins, Jr. et al. |
| 9,364,625 B2 | 6/2016 | Silver et al. |
| 9,369,182 B2 | 6/2016 | Kurs et al. |
| 9,375,374 B2 | 6/2016 | Herman et al. |
| 9,381,125 B2 | 7/2016 | Herbst et al. |
| 9,392,875 B2 | 7/2016 | Weyl |
| 9,397,518 B1 | 7/2016 | Theobald |
| 9,407,110 B2 | 8/2016 | Lui et al. |
| 9,425,640 B2 | 8/2016 | Moran |
| 9,427,367 B2 | 8/2016 | White et al. |
| 9,433,546 B2 | 9/2016 | Rawls-Meehan et al. |
| 9,444,520 B2 | 9/2016 | Hall et al. |
| 9,451,833 B2 | 9/2016 | Rawls-Meehan |
| 9,456,939 B2 | 10/2016 | Lambarth et al. |
| 9,463,126 B2 | 10/2016 | Zerhusen et al. |
| 9,463,324 B2 | 10/2016 | Olson et al. |
| 9,465,915 B2 | 10/2016 | McNeely et al. |
| 9,492,339 B2 | 11/2016 | Leib |
| 9,496,719 B2 | 11/2016 | Kesler et al. |
| 9,513,899 B2 | 12/2016 | Collins, Jr. et al. |
| 9,515,494 B2 | 12/2016 | Kurs et al. |
| 9,515,495 B2 | 12/2016 | Kurs et al. |
| 9,517,034 B2 | 12/2016 | Collins, Jr. et al. |
| 9,526,346 B2 | 12/2016 | Rawls-Meehan |
| 9,526,665 B2 | 12/2016 | Rawls-Meehan et al. |
| 9,527,699 B2 | 12/2016 | Liljedahl |
| 9,537,344 B2 | 1/2017 | Thompson et al. |
| 9,560,787 B2 | 1/2017 | Kallmyer et al. |
| 9,577,436 B2 | 2/2017 | Kesler et al. |
| 9,584,189 B2 | 2/2017 | Kurs et al. |
| 9,596,005 B2 | 3/2017 | Kurs et al. |
| 9,601,261 B2 | 3/2017 | Schatz et al. |
| 9,601,270 B2 | 3/2017 | Kurs et al. |
| 9,615,983 B2 | 4/2017 | Stryker et al. |
| 9,734,293 B2 | 8/2017 | Collins, Jr. et al. |
| 9,768,645 B2 | 9/2017 | Tetu et al. |
| 10,004,651 B2 | 6/2018 | DeLuca et al. |
| 10,568,792 B2 * | 2/2020 | Derenne ............. B60B 33/0086 |
| 2002/0011361 A1 * | 1/2002 | Richey, II ........... B60L 15/2036 180/6.5 |
| 2003/0079923 A1 | 5/2003 | Johnson |
| 2004/0083394 A1 | 4/2004 | Brebner et al. |
| 2005/0155149 A1 | 7/2005 | Pedersen |
| 2006/0059623 A1 | 3/2006 | Karmer et al. |
| 2006/0108977 A1 | 5/2006 | Kagermeier et al. |
| 2006/0190176 A1 * | 8/2006 | Gleacher ............. B60R 21/0132 701/301 |
| 2006/0249320 A1 * | 11/2006 | Carter .................... B60K 25/08 180/65.51 |
| 2007/0211866 A1 | 9/2007 | Sink |
| 2007/0219950 A1 | 9/2007 | Crawford |
| 2007/0256872 A1 * | 11/2007 | Yamamuro ............ A61G 5/045 180/65.51 |
| 2007/0299473 A1 | 12/2007 | Matos |
| 2008/0041282 A1 | 2/2008 | Goschy et al. |
| 2008/0086817 A1 | 4/2008 | Zucker et al. |
| 2008/0295595 A1 | 12/2008 | Tacklind et al. |
| 2009/0121660 A1 | 5/2009 | Rawls-Meehan |
| 2010/0045146 A1 | 2/2010 | Thorne |
| 2010/0277121 A1 | 11/2010 | Hall et al. |
| 2010/0314946 A1 | 12/2010 | Budde et al. |
| 2010/0328044 A1 | 12/2010 | Waffenschmidt et al. |
| 2011/0011878 A1 | 1/2011 | Baer et al. |
| 2011/0043049 A1 | 2/2011 | Karalis et al. |
| 2011/0066287 A1 * | 3/2011 | Flanagan ................ A61G 7/018 700/275 |
| 2011/0117529 A1 | 5/2011 | Barash et al. |
| 2011/0162067 A1 | 6/2011 | Shuart et al. |
| 2011/0208074 A1 | 8/2011 | Anderson |
| 2011/0247134 A1 | 10/2011 | Howell et al. |
| 2011/0247137 A1 | 10/2011 | Herman et al. |
| 2011/0278948 A1 | 11/2011 | Forsell |
| 2011/0298420 A1 | 12/2011 | Forsberg et al. |
| 2012/0056729 A1 | 3/2012 | Rawls-Meehan |
| 2012/0057685 A1 | 3/2012 | Rawls-Meehan |
| 2012/0069961 A1 | 3/2012 | Pomper et al. |
| 2012/0084920 A1 | 4/2012 | Zucker et al. |
| 2012/0086284 A1 | 4/2012 | Capanella et al. |
| 2012/0091794 A1 | 4/2012 | Campanella et al. |
| 2012/0091796 A1 | 4/2012 | Kesler et al. |
| 2012/0091797 A1 | 4/2012 | Kesler et al. |
| 2012/0091819 A1 | 4/2012 | Kulikowski et al. |
| 2012/0091820 A1 | 4/2012 | Campanella et al. |
| 2012/0091949 A1 | 4/2012 | Campanella et al. |
| 2012/0110738 A1 | 5/2012 | Rawls-Meehan |
| 2012/0110824 A1 | 5/2012 | Smith et al. |
| 2012/0112536 A1 | 5/2012 | Karalis et al. |
| 2012/0112538 A1 | 5/2012 | Kesler et al. |
| 2012/0112691 A1 | 5/2012 | Kurs et al. |
| 2012/0117730 A1 * | 5/2012 | Lemire ................... A61G 5/10 5/611 |
| 2012/0119569 A1 | 5/2012 | Karalis et al. |
| 2012/0119698 A1 | 5/2012 | Karalis et al. |
| 2012/0123242 A1 | 5/2012 | Stilley et al. |
| 2012/0139355 A1 | 6/2012 | Ganem et al. |
| 2012/0187661 A1 * | 7/2012 | Kim ........................ A61H 3/04 280/650 |
| 2012/0228952 A1 | 9/2012 | Hall et al. |
| 2012/0235501 A1 | 9/2012 | Kesler et al. |
| 2012/0235502 A1 | 9/2012 | Kesler et al. |
| 2012/0235504 A1 | 9/2012 | Kesler et al. |
| 2012/0235566 A1 | 9/2012 | Karalis et al. |
| 2012/0242159 A1 | 9/2012 | Lou et al. |
| 2012/0248886 A1 | 10/2012 | Kesler et al. |
| 2012/0248887 A1 | 10/2012 | Kesler et al. |
| 2012/0248888 A1 | 10/2012 | Kesler et al. |
| 2012/0248981 A1 | 10/2012 | Karalis et al. |
| 2012/0312196 A1 | 12/2012 | Newkirk |
| 2013/0106347 A1 | 5/2013 | Kallmyer et al. |
| 2013/0109973 A1 | 5/2013 | Kurokawa |
| 2013/0191992 A1 | 8/2013 | Rawls-Meehan |
| 2014/0004814 A1 | 1/2014 | Elghazzawi |

(56) References Cited

U.S. PATENT DOCUMENTS

| | | |
|---|---|---|
| 2014/0031883 A1 | 1/2014 | Elghazzawi |
| 2014/0039351 A1 | 2/2014 | Mix et al. |
| 2014/0045367 A1 | 2/2014 | Christie et al. |
| 2014/0057235 A1 | 2/2014 | Kellum et al. |
| 2014/0090173 A1 | 4/2014 | DiMaio et al. |
| 2014/0139405 A1 | 5/2014 | Ribble et al. |
| 2014/0145915 A1 | 5/2014 | Ribble et al. |
| 2014/0195057 A1 | 7/2014 | Zerhusen et al. |
| 2014/0259414 A1 | 9/2014 | Hayes et al. |
| 2014/0285016 A1 | 9/2014 | Tetu et al. |
| 2014/0312706 A1 | 10/2014 | Fiorello et al. |
| 2014/0312707 A1 | 10/2014 | Fiorello et al. |
| 2014/0327320 A1 | 11/2014 | Muhs et al. |
| 2014/0343968 A1 | 11/2014 | Wilson et al. |
| 2015/0069831 A1 | 3/2015 | Kesler et al. |
| 2015/0075575 A1 | 3/2015 | Karlovich |
| 2015/0088129 A1 | 3/2015 | Ganem et al. |
| 2015/0107020 A1 | 4/2015 | Andersson et al. |
| 2015/0115638 A1 | 4/2015 | Lambarth et al. |
| 2015/0123484 A1 | 5/2015 | Kurs et al. |
| 2015/0128353 A1 | 5/2015 | Kildey |
| 2015/0128354 A1 | 5/2015 | Greenstein et al. |
| 2015/0130412 A1 | 5/2015 | Partovi |
| 2015/0130586 A1 | 5/2015 | Rawls-Meehan |
| 2015/0135436 A1 | 5/2015 | Stryker et al. |
| 2015/0207351 A1 | 7/2015 | Hamburgen et al. |
| 2015/0216749 A1 | 8/2015 | Heil et al. |
| 2015/0251322 A1 | 9/2015 | Goodwin et al. |
| 2015/0252940 A1 | 9/2015 | Goodwin et al. |
| 2015/0255994 A1 | 9/2015 | Kesler et al. |
| 2015/0290061 A1 | 10/2015 | Stafford et al. |
| 2015/0296550 A1 | 10/2015 | Shelly et al. |
| 2015/0297427 A1 | 10/2015 | Lambarth et al. |
| 2015/0297439 A1 | 10/2015 | Karlovich |
| 2015/0335506 A9 | 11/2015 | Kildey |
| 2015/0342806 A1 | 12/2015 | Hyde et al. |
| 2015/0351981 A1 | 12/2015 | Sazonov |
| 2015/0351982 A1 | 12/2015 | Krenik |
| 2015/0357831 A1 | 12/2015 | Fiorello et al. |
| 2015/0362333 A1 | 12/2015 | Miller et al. |
| 2015/0365138 A1 | 12/2015 | Miller et al. |
| 2016/0000622 A1 | 1/2016 | Rawls-Meehan |
| 2016/0013837 A1 | 1/2016 | Howell et al. |
| 2016/0022218 A1 | 1/2016 | Hayes et al. |
| 2016/0028243 A1 | 1/2016 | Schatz et al. |
| 2016/0043571 A1 | 2/2016 | Kesler et al. |
| 2016/0052129 A1 | 2/2016 | Ekas |
| 2016/0052137 A1 | 2/2016 | Hyde et al. |
| 2016/0052138 A1 | 2/2016 | Hyde et al. |
| 2016/0052139 A1 | 2/2016 | Hyde et al. |
| 2016/0067396 A1 | 3/2016 | Stark et al. |
| 2016/0070267 A1 | 3/2016 | Hyde et al. |
| 2016/0075177 A1 | 3/2016 | Biderman et al. |
| 2016/0089283 A1 | 3/2016 | DeLuca et al. |
| 2016/0117450 A1 | 4/2016 | Zerhusen et al. |
| 2016/0120722 A1 | 5/2016 | Mueller |
| 2016/0120740 A1 | 5/2016 | Rawls-Meehan |
| 2016/0128468 A1 | 5/2016 | Lafleche et al. |
| 2016/0136018 A1 | 5/2016 | DeLuca et al. |
| 2016/0149425 A1 | 5/2016 | Hsu |
| 2016/0158082 A1 | 6/2016 | Gainor et al. |
| 2016/0158083 A1 | 6/2016 | Lambarth et al. |
| 2016/0175602 A1 | 6/2016 | Aoyama et al. |
| 2016/0193397 A9 | 7/2016 | Aber et al. |
| 2016/0199983 A1 | 7/2016 | Hyde et al. |
| 2016/0211695 A1 | 7/2016 | Singer |
| 2016/0213537 A1 | 7/2016 | Hayes et al. |
| 2016/0242558 A1 | 8/2016 | Rawls-Meehan et al. |
| 2016/0242681 A1 | 8/2016 | Shen et al. |
| 2016/0256080 A1 | 9/2016 | Shen et al. |
| 2016/0275776 A1 | 9/2016 | Shen et al. |
| 2016/0301253 A1 | 10/2016 | Kurs et al. |
| 2016/0306762 A1 | 10/2016 | Lee et al. |
| 2016/0330402 A1 | 11/2016 | Benetti et al. |
| 2016/0336812 A1 | 11/2016 | Fiorello et al. |
| 2016/0338891 A1 | 11/2016 | Agdeppa et al. |
| 2016/0362015 A1 | 12/2016 | Fiorello et al. |
| 2016/0367415 A1 | 12/2016 | Hayes et al. |
| 2016/0367420 A1 | 12/2016 | Zerhusen et al. |
| 2016/0374884 A1 | 12/2016 | Blickensderfer et al. |
| 2017/0011181 A1 | 1/2017 | McNeely et al. |
| 2017/0020440 A1 | 1/2017 | Flitsch et al. |
| 2017/0027789 A1 | 2/2017 | St.John et al. |
| 2017/0035295 A1 | 2/2017 | Collins, Jr. et al. |
| 2017/0035370 A1 | 2/2017 | Collins, Jr. et al. |
| 2017/0047762 A1 | 2/2017 | Tuseth et al. |
| 2017/0053736 A9 | 2/2017 | Hall et al. |
| 2017/0053737 A1 | 2/2017 | Kurs |
| 2017/0054319 A1 | 2/2017 | Kesler et al. |
| 2017/0055882 A1 | 3/2017 | Al-Ali et al. |
| 2017/0055887 A1 | 3/2017 | Al-Ali |
| 2017/0062124 A9 | 3/2017 | Hall et al. |
| 2017/0063143 A1 | 3/2017 | Hoarau et al. |
| 2017/0065766 A1 | 3/2017 | Olson et al. |
| 2017/0098044 A1 | 4/2017 | Lai et al. |
| 2017/0119607 A1 | 5/2017 | Derenne et al. |
| 2017/0172827 A1 | 6/2017 | Schaaf et al. |
| 2017/0281440 A1 | 10/2017 | Puvogel et al. |
| 2018/0162433 A1* | 6/2018 | Jones .................... B62B 5/0053 |

FOREIGN PATENT DOCUMENTS

| | | |
|---|---|---|
| CN | 104097531 A | 10/2014 |
| EP | 0315210 B1 | 7/1994 |
| EP | 0700574 B1 | 7/1997 |
| WO | 8903665 A1 | 5/1989 |
| WO | 9100054 A1 | 1/1991 |
| WO | 9428560 A1 | 12/1994 |
| WO | 9620754 A1 | 7/1996 |
| WO | 2004038890 A1 | 5/2004 |
| WO | 2005016216 A2 | 2/2005 |
| WO | 2005077102 A2 | 8/2005 |
| WO | 2007063500 A2 | 6/2007 |
| WO | 2007064609 A1 | 6/2007 |
| WO | 2007118221 A2 | 10/2007 |
| WO | 2007136733 A2 | 11/2007 |
| WO | 2008003027 A2 | 1/2008 |
| WO | 2008036087 A1 | 3/2008 |
| WO | 2008050260 A1 | 5/2008 |
| WO | 2008050292 A2 | 5/2008 |
| WO | 2008055664 A2 | 5/2008 |
| WO | 2008150448 A1 | 12/2008 |
| WO | 2009009296 A3 | 3/2009 |
| WO | 2009055203 A1 | 4/2009 |
| WO | 2009055432 A2 | 4/2009 |
| WO | 2009120970 A2 | 10/2009 |
| WO | 2009123780 A1 | 10/2009 |
| WO | 2009135081 A2 | 11/2009 |
| WO | 2010027282 A2 | 3/2010 |
| WO | 2010036980 A1 | 4/2010 |
| WO | 2010059096 A1 | 5/2010 |
| WO | 2010059097 A1 | 5/2010 |
| WO | 2010093997 A1 | 8/2010 |
| WO | 2011096111 A1 | 8/2011 |
| WO | 2011113070 A1 | 9/2011 |
| WO | 2011156768 A2 | 12/2011 |
| WO | 2012087807 A2 | 6/2012 |
| WO | 2012100219 A1 | 7/2012 |
| WO | 2012122002 A1 | 9/2012 |
| WO | 2012135118 A1 | 10/2012 |
| WO | 2012170278 A2 | 12/2012 |
| WO | 2013006845 A2 | 1/2013 |
| WO | 2013009881 A2 | 1/2013 |
| WO | 2013049979 A1 | 4/2013 |
| WO | 2013050699 A1 | 4/2013 |
| WO | 2013044165 A3 | 5/2013 |
| WO | 2013062808 A1 | 5/2013 |
| WO | 2013062809 A2 | 5/2013 |
| WO | 2013072306 A1 | 5/2013 |
| WO | 2013074452 A2 | 5/2013 |
| WO | 2013078092 A1 | 5/2013 |
| WO | 2013112782 A2 | 8/2013 |
| WO | 2013123119 A1 | 8/2013 |
| WO | 2013131078 A1 | 9/2013 |

(56) References Cited

FOREIGN PATENT DOCUMENTS

| WO | 2013142840 A1 | 9/2013 |
|---|---|---|
| WO | 2013156907 A2 | 10/2013 |
| WO | 2013158675 A1 | 10/2013 |
| WO | 2014014581 A2 | 1/2014 |
| WO | 2014043659 A1 | 3/2014 |
| WO | 2014046844 A1 | 3/2014 |
| WO | 2014052147 A2 | 4/2014 |
| WO | 2014052148 A2 | 4/2014 |
| WO | 2014078667 A1 | 5/2014 |
| WO | 2014097055 A1 | 6/2014 |
| WO | 2014113164 A1 | 7/2014 |
| WO | 2014150970 A1 | 9/2014 |
| WO | 2014151577 A1 | 9/2014 |
| WO | 2014164248 A1 | 10/2014 |
| WO | 2015010702 A1 | 1/2015 |
| WO | 2015106239 A1 | 7/2015 |
| WO | 2015108653 A1 | 7/2015 |
| WO | 2015148578 A2 | 10/2015 |
| WO | 2015191819 A1 | 12/2015 |
| WO | 2016090384 A2 | 6/2016 |
| WO | 2016167594 A1 | 10/2016 |
| WO | 2016179562 A1 | 11/2016 |
| WO | 2017025735 A1 | 2/2017 |
| WO | 2017040317 A1 | 3/2017 |

OTHER PUBLICATIONS

Daily Mail Reporter, "Move over Fred Flintstone: The human-powered car that can reach speeds of up to 60mph", http://www.dailymail.co.uk/motoring/article-1304120/The-human-powered-car-reach-speeds-60mph.html, Aug. 19, 2010, 5 Pages.

English language abstract and machine-assisted English translation for CN 104097531 extracted from espacenet.com database on Jan. 10, 2019, 6 pages.

English language abstract and machine-assisted English translation for WO 2013/072306 extracted from espacenet.com database on Jan. 10, 2019, 14 pages.

English language abstract and machine-assisted English translation for WO 91/00054 extracted from espacenet.com database on Jan. 14, 2019, 11 pages.

English language abstract for WO 2008/055664 extracted from espacenet.com database on Jan. 14, 2019, 2 pages.

English language abstract for WO 2011/096111 and machine-assisted English translation for CN 102812617, an equivalent of WO 2011/096111, extracted from espacenet.com database on Jan. 10, 2019, 22 pages.

English language abstract for WO 2013/049979 extracted from espacenet.com database on Jan. 10, 2019, 1 page.

English language abstract for WO 2013/050699 extracted from espacenet.com database on Jan. 14, 2019, 1 page.

English language abstract not found for AU 2008316723; however, see English language equivalent U.S. Pat. No. 9,734,293. Original document extracted from espacenet.com databasse on Jan. 10, 2019, 1 page.

EZ-Wheel, "La Premiere Roue Electrique Autonome-Integrant Moteur and Batteries Brochure", http://www.ez-wheel.com, 2017, 8 pages.
Stryker SA, "Prime TC Transport Chair Brochure", 2013, 8 pages.
U.S. Appl. No. 16/168,089, filed Oct. 23, 2018.
Youtube "Tesla Charging Snake Video", Aug. 6, 2015, https://www.youtube.com/watch?v=ut3sELMOyTM, 3 pages.

\* cited by examiner

ENERGY HARVESTING AND PROPULSION ASSISTANCE TECHNIQUES FOR A PATIENT SUPPORT APPARATUS

RELATED APPLICATIONS

This application claims priority to and the benefit of U.S. Provisional Patent Application No. 62/576,303, filed on Oct. 24, 2017, the entire contents and disclosure of which are hereby incorporated herein by reference.

BACKGROUND

Patient support apparatuses such as hospital beds, stretchers, cots, wheelchairs, and chairs are routinely used by operators to move patients from one location to another. Conventional patient support apparatuses comprise a base and a patient support surface upon which the patient is supported. Wheels are coupled to the base to enable transport over floor surfaces.

A significant number of patient support apparatuses are not powered. However, there is increasing demand to provide patient support apparatuses with energy-consuming devices, such as motors, sensors, and electronics. Conventionally, such energy is provided by either a primary (non-rechargeable) battery or a rechargeable battery. Primary batteries require frequent replacement and add weight and cost to the patient support apparatuses. Rechargeable batteries require personnel to plug the patient support apparatus to an external electrical outlet (or station) for charging, thereby adding overhead costs, reducing availability for usage of the patient support apparatus and inconveniently requiring the patient support apparatus to include an electrical power cord. Thus, conventional energy systems for patient support apparatuses are undesirable for at least these reasons.

Moreover, mobility is a central characteristic of patient support apparatuses. Yet, mobility can be a challenge in various situations. For example, the user effort needed to move the patient support apparatus is high when initiating movement, moving uphill, turning, moving a heavy load, moving along a high-friction surface (e.g., carpet), or the like. Conventional patient support apparatuses have provided drive systems to address these high-effort situations. However, such drive systems require the user to decide when a high-effort situation exists and manually activate and deactivate the drive system. Such manual input can become burdensome on the user.

A patient support apparatus with features designed to overcome one or more of the aforementioned challenges is desired.

DETAILED DESCRIPTION

I. Patient Support Apparatus Overview

Figure 1:
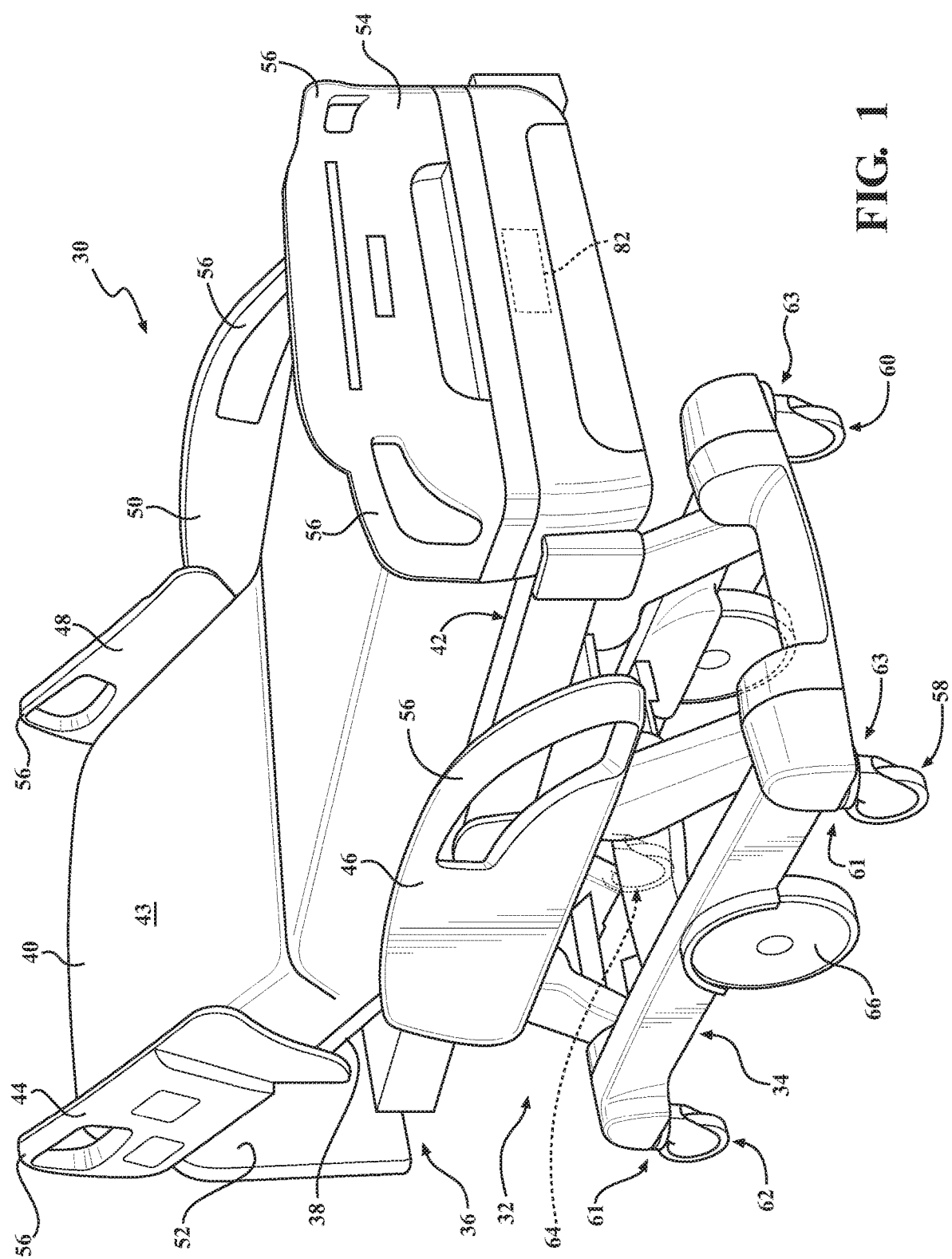
FIG. 1 is perspective view of a patient support apparatus.

Referring to FIG. 1, a patient support apparatus 30 is shown for moving a patient from one location to another. The patient support apparatus 30 illustrated in FIG. 1 is a hospital bed. In other embodiments, however, the patient support apparatus 30 may be a stretcher, cot, wheelchair, chair, or similar apparatus.

A support structure 32 provides support for the patient during movement of the patient support apparatus 30. The support structure 32 illustrated in FIG. 1 comprises a base 34 and an intermediate frame 36. The intermediate frame 36 is spaced above the base 34. The support structure 32 also comprises a patient support deck 38 disposed on the intermediate frame 36. The patient support deck 38 may comprise several sections, some of which are pivotable relative to the intermediate frame 36, such as a head section, a seat section, a thigh section, and a foot section. The patient support deck 38 provides a patient support surface 42 upon which the patient is supported. The patient support surface 42 is supported by the base 34.

A mattress 40 is disposed on the patient support deck 38. The mattress 40 comprises a direct patient support surface 43 upon which the patient is supported. The base 34, intermediate frame 36, patient support deck 38, and patient support surfaces 42, 43 each have a head end and a foot end corresponding to the designated placement of the patient's head and feet on the patient support apparatus 30. The construction of the support structure 32 may take on any known or conventional design, and is not limited to that specifically set forth above.

Side rails 44, 46, 48, 50 are coupled to the intermediate frame 36. A first side rail 44 is positioned at a right head end of the intermediate frame 36. A second side rail 46 is positioned at a right foot end of the intermediate frame 36. A third side rail 48 is positioned at a left head end of the intermediate frame 36. A fourth side rail 50 is positioned at a left foot end of the intermediate frame 36. If the patient support apparatus 30 is a stretcher or a cot, there may be fewer side rails. The side rails 44, 46, 48, 50 are movable between a raised position in which they block ingress and egress into and out of the patient support apparatus 30, one or more intermediate positions, and a lowered position in which they are not an obstacle to enable such ingress and egress. In still other configurations, the patient support apparatus 30 may not include any side rails.

A headboard 52 and a footboard 54 are coupled to the intermediate frame 36. In other embodiments, when the headboard 52 and footboard 54 are included, the headboard 52 and footboard 54 may be coupled to other locations on the patient support apparatus 30, such as the base 34. In still other embodiments, the patient support apparatus 30 does not include the headboard 52 or the footboard 54.

Operator (human control) interfaces 56, such as handles, are shown integrated into the footboard 54 and side rails 44, 46, 48, 50 to facilitate movement of the patient support apparatus 30 over the floor surfaces. Additional operator interfaces 56 may be integrated into the headboard 52 and/or other components of the patient support apparatus 30. The operator interfaces 56 are graspable by the operator to manipulate the patient support apparatus 30 for movement. The operator interface 56 may comprise one or more handles coupled to the intermediate frame 36. The operator interface 56 may simply be a surface on the patient support apparatus 30 upon which the operator logically applies force to cause movement of the patient support apparatus 30 in one or more directions, also referred to as a push location. This may comprise one or more surfaces on the intermediate frame 36 or base 34. This could also comprise one or more surfaces on or adjacent to the headboard 52, footboard 54, and/or side rails 44, 46, 48, 50. In other embodiments, the operator interface 56 may comprise separate handles for each hand of the operator. For example, the operator interface 56 may comprise two handles. Other forms of the operator interface 56 are also contemplated.

One or more wheels 58, 60, 62, 64 are coupled to the base 34 to facilitate transport over floor surfaces. In one example, as shown in FIG. 1, the wheels 58, 60, 62, 64 are arranged in each of four quadrants of the base 34 adjacent to corners of the base 34. In the embodiment shown, the wheels 58, 60, 62, 64 are caster wheels able to rotate and swivel relative to the support structure 32 during transport. In other embodiments, the wheels 58, 60, 62, 64 are not caster wheels and may be non-steerable, steerable, non-powered, powered (driven), or combinations thereof.

Additionally, one or more auxiliary wheels 66 (powered or non-powered), which may be movable between stowed positions and deployed positions, may be coupled to the support structure 32. In some cases, when these auxiliary wheels 66 are located between the caster wheels 58, 60, 62, 64 and contact the floor surface in the deployed position, they cause two of the caster assemblies 66 to be lifted off the floor surface thereby shortening a wheel base of the patient support apparatus 30. Such auxiliary wheels 66 may also be arranged substantially in a center of the base 34.

The wheels 58, 60, 62, 64, 66 may have any suitable configuration and arrangement depending on the specific type of patient support apparatus 30. For example, when the patient support apparatus 30 is a wheelchair, the patient support apparatus 30 may comprise two front caster wheels and two rear driven wheels.

The patient support apparatus 30 comprises a powered device 70. The powered device 70 is a device that is actively energized and consumes energy. The powered device 70 is connected to a power supply (described below), which stores such energy for consumption. The powered device 70 may have any suitable load and may require variable amounts of energy. The patient support apparatus 30 may comprise any suitable number of powered devices 70. Examples of the powered devices 70 are shown in the block diagram of FIG. 2.

The powered device 70 may be a propulsion device 72 configured to assist in movement of the patient support apparatus 30 when driven. The propulsion device 72 is configured to apply force or torque to propel the patient support apparatus 30 in variable directions and according to variable speed and acceleration. For example, the propulsion device 72 may be a motor coupled to the caster wheels 58, 60, 62, 64 and/or the auxiliary wheels 66. The propulsion device 72 may have any suitable configuration and energized components propelling the patient support apparatus 30 along the floor surface.

In another instance, the powered device 70 may be a pre-swivel mechanism configured to swivel the caster wheels 58, 60, 62, 64 about a swivel axis from a non-trailing orientation toward a trailing orientation relative to a direction of desired movement of the patient support apparatus 30. Additionally or alternatively, the powered device 70 may be a steer lock mechanism configured to lock the caster wheels 58, 60, 62, 64 in a predetermined position for purposes such as facilitating movement of the patient support apparatus 30 down long hallways, and around corners or obstacles, or the like. Examples of pre-swivel and steer lock mechanisms for the patient support apparatus 30 can be like those described in United States Non-Provisional Patent Application Publication No. 2017/0119607, filed on Oct. 27, 2016, entitled, "Systems And Methods For Facilitating Movement Of A Patient Transport Apparatus," the disclosure of which is hereby incorporated by reference in its entirety.

In another example, the powered device 70 is an electronic scale 74. The electronic scale 74 may be part of a scale system in communication with a plurality of sensors, such as load cells, that are used for detecting patient weight and/or patient presence. In such instances, the scale system, and its subcomponents, may be the powered devices 70. The sensors of the electronic scale 74 may be attached to the patient support surface 42. The electronic scale 74, and scale system, may have various other configurations for detecting patient weight and/or patient presence.

The powered device 70 may be a user interface (UI) device 76 provided for communicating with the operator and/or accepting user input to enable the operator to control aspects of the patient support apparatus 30. Examples of communications or control implemented by the user interface device 76 include, but are not limited to, alarm indicators (e.g., bed exit alarm, brake alarm, change equipment alarm), messages (e.g., bed awareness messages, conditional messages), menus, status screens (e.g., power up screen), and the like. The user interface device 76 may comprise a digital display (e.g., backlit display), buttons, touch-screens, voice activation, gesture sensors, remote control, LED indicators, hand levers, foot pedals, brake pedals, other suitable user input devices, or combinations thereof. The user interface device 76 may be mounted to the headboard 52, footboard 54, side rails 44, 46, 48, 50, or any other suitable location on the patient support apparatus 30. The user interface device 76 may also be removably attached to or located remotely from the patient support apparatus 30. The user interface device 76 may have any other suitable configuration for communicating with the operator and/or accepting user input to enable the operator to control aspects of the patient support apparatus 30.

In other examples, the powered device 70 is a communication device 78 for enabling communication with other components of the patient support apparatus 30 and/or to enable the patient support apparatus 30 to communicate with external communication sources. The communication device 78 may be wireless or wired. Examples of such communication devices 78 include, but are not limited to, transmitters, mobile RF communication devices, receivers, transponders, transceivers, near-field communication devices, antennae, low power IEEE 802.15.1 enabled devices, infrared devices, wireless access points, Wi-Fi devices or modules, and the like. The communication device 78 may have any other suitable configuration for implementing those functions described herein, and those not specifically recited herein.

The powered device 70 may be any other electronic sensor 80 employed by the patient support apparatus 30, including, but not limited to, force sensors (e.g., sensors for any of the headboard 52, footboard 54, and/or side rails 44, 46, 48, 50), steering sensors, brake sensors, speed sensors, position sensors, electronic accelerometers, electronic gyroscopic sensors, potentiometers, strain gauges, capacitive sensors, piezoresistive sensors, proximity sensors (e.g., Hall Effect sensors), piezoelectric sensors, and combinations thereof. Moreover, the powered device 70 may be condition sensors 110, which are described in the techniques below.

Moreover, the powered device 70 may be a controller 82 in communication with and for controlling any of the aforementioned components of the patient support apparatus 30. The controller 82 may comprise any suitable signal processing means and computer executable instructions or software modules stored in non-transitory memory wherein the executable instructions or modules may be executed by processor, or the like. Additionally, or alternatively, the controller 82 may comprise a microcontroller, one or more integrated circuits, logic parts, and the like for enabling the same. The controller 82 may have any suitable configuration for enabling the controller 82 to perform various tasks related to operation of the patient support apparatus 30, such as those described below.

The powered device 70 may be any other device configured to consume power, such as display devices, accessory devices, lighting equipment, night lights, reading lights, backlighting, power indicators, sleep/wake circuits, clocks, backup power devices, battery charging circuits, and the like.

II. Energy Harvest and Release System

As represented in the system diagram of FIG. 2, the patient support apparatus 30 is equipped with an energy harvest and release system 90 (hereinafter "system"). The system 90 comprises a harvesting device 92 being configured to harvest energy, a storage device 94 being configured to store and release the harvested energy and the controller 82 coupled to the harvesting device 92 and the storage device 94. The controller 82 is coupled to or in communication with the powered device 70 that consumes the harvested energy. The controller 82 is automated to selectively instruct the harvesting device 92 to harvest energy and to selectively instruct release of the harvested energy from the storage device 94 for consumption by the powered device 70.

As used herein, the term "harvested energy" refers to energy that is collected, scavenged, or otherwise harvested "on-the-fly" from ambient energy sources interacting or involved with the patient support apparatus 30. Harvested energy is distinguished from conventional (non-harvested) energy from a power source, such as a primary or rechargeable battery or external electric outlet, that is installed in or connected to the patient support apparatus 30, wherein such conventional energy is either previously stored at the time of manufacture of the battery, previously stored as a result of recharging the battery from an electric outlet, or provided directly from the electrical outlet.

The harvesting device 92 may comprise or be coupled to a transducer 96 for converting the harvested energy into electrical signals for the controller 82 or electrical power for storage in the storage device 94. As shown in FIG. 2, the controller 82 is coupled to the harvesting device 92. The controller 82 may control, receive signals from, send signals to, and otherwise communicate with the harvesting device 92. In one embodiment, the controller 82 optionally utilizes control block 100A for performing these functions. Any of the control blocks 100 described herein may be disposed on a PCB external to the controller 82, may be integrated within the controller 82 itself, or may be integrated with the device being controlled. Any of the control blocks 100 may comprise any suitable switches (e.g., transistors), integrated circuits, and other electrical components for facilitating control between the controller 82 and the harvesting device 92. Additionally, or alternatively, the control block 100 may be a software block or module. The controller 82 may be powered from power generated by the harvesting device 92, and/or power stored in any of the storage devices 94, 102.

The harvesting device 92 may derive harvested energy from various sources of ambient energy interacting or involved with the patient support apparatus 30. In one embodiment, the harvesting device 92 may derive harvested energy from kinetic or mechanical energy provided from motion of the patient support apparatus 30 or components of the patient support apparatus 30.

Figure 3:
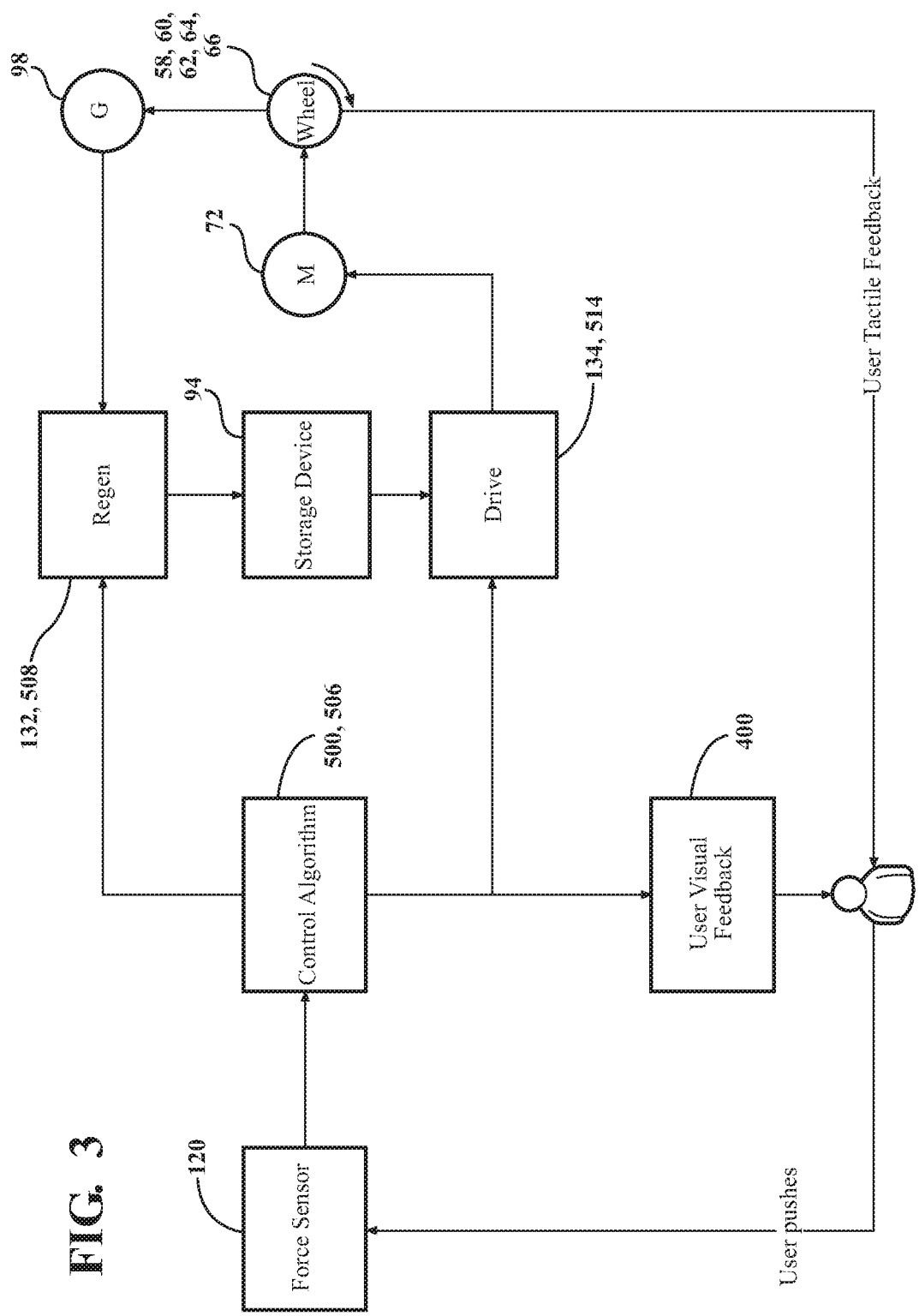
FIG. 3 is a flow chart of one embodiment of the energy harvesting and release system for providing propulsion assistance to the patient support apparatus, as well as techniques for providing user feedback relating to the same.

In one example, as shown in FIG. 3, the harvesting device 92 is a generator 98, such as a rotational generator, configured to harvest kinetic energy from movement (e.g., rotation) of one or more wheels 58, 60, 62, 64, 66 (or wheel axles) of the patient support apparatus 30. In one example, as shown, one or more of the wheels 58, 60, 62, 64, 66 are driven by the propulsion device 72 (e.g., a motor), being separate from the generator 98. As the wheels 58, 60, 62, 64, 66 rotate, the generator 98 converts mechanical energy from rotation into harvested energy for storage in the storage device 94, thereby regenerating the storage device 94. This same harvested energy may be released back to the propulsion device 72 thereby repeating the process in a closed-loop manner. In other examples, the generator 98 and propulsion device 72 may be combined into a motor-generator (e.g., dynamo) configured to selectively perform driving functions of the propulsion device 72 and harvesting functions of generator 98 depending on the situation. In one instance, the motor-generator may be part of a regenerative braking system configured to harvest energy absorbed during braking of the patient support apparatus 30. In other embodiments, the harvesting device 92 is hydraulic or spring based (as described below). Any other type of harvesting device 92 besides those described above may be utilized to derive harvested energy from kinetic or mechanical energy.

In FIG. 3, the controller 82 implements a control algorithm (e.g., method 500, described below) to control this loop. Further details regarding control algorithms involved with the propulsion device 72 are provided below.

In another example, the harvesting device 92 is a piezoelectric generator for harvesting energy from mechanical stress applied to one or more components of the patient support apparatus 30. For such situations, the harvesting device 92 may be a capacitive generator and/or electromagnetic induction generator. Such generators, for example, may be configured to harvest energy from vibrations applied to one or more components of the patient support apparatus 30. Examples, of the components of the patient support apparatus 30 involved in such harvesting of kinetic or mechanical energy include, but are not limited to, the side rails 44, 46, 48, 50, headboard 52, footboard 54, operator interfaces 56, wheels 58, 60, 62, 64, 66, support structure 32, base 34, intermediate frame 36, support deck 38, mattress 40, patient support surface 42, direct patient support surface 43, or any combination thereof. Such mechanical stress or vibrations may result from, for example, patient provided movement, operator provided movement, component adjustment or movement, vibrations during movement of the patient support apparatus 30 generally, and the like. Any other type of harvesting device 92 besides those described above may be utilized to derive harvested energy from mechanical stress or vibrations.

In yet another example, the harvesting device 92 is an array of photovoltaic cells configured to harvest energy from light surrounding the patient support apparatus 30. The sources of light may be sunlight, indoor lighting, or any other type of ambient light. The photovoltaic cells may be positioned on any suitable location on the patient support apparatus 30. For example, the photovoltaic cells may be positioned on high-exposure areas, such as on the side rails 44, 46, 48, 50, headboard 52, footboard 54, or the like. Any suitable number of arrays may be utilized. Any other type of harvesting device 92 besides those described above may be utilized to derive harvested energy from light.

In other examples, the harvesting device 92 may harvest energy from heat. Such heat may be from sunlight or light any lighting equipment. In other example, heat may be from a patient body on the support surface 42 or any surface when someone is sitting or lying. In other examples, heat may be from the caregiver's hand (e.g., during pushing of the patient support apparatus 30), heat dissipated from use of electrical devices, such as batteries, and/or heat dissipated from mechanical movement of any component of the patient support apparatus 30, such as any of the wheels. Examples of harvesting devices 92 that may harvest energy from heat include, but are not limited to thermoelectric generators, thermomechanical generators, thermochemical generators, and the like.

Any of the aforementioned harvesting devices 92 may be utilized in combination to enable a diversity of techniques for harvesting energy for any condition, situation, or environment to which the patient support apparatus 30 may be subjected.

The storage device 94 may be a mechanical storage device, an electrical storage device, or an electrochemical storage device. Examples of mechanical storage techniques include, potential energy storage (e.g. elastic potential energy, such as springs), flywheel energy storage (e.g., kinetic energy is stored in a rotating mass at high velocity), compressed air energy storage (CAES), liquid nitrogen storage, hydraulic accumulator storage, pumped-storage hydroelectricity, or the like. Examples of electrical storage include, capacitor storage, superconducting magnetic energy storage (SMES), and the like. Examples of electrochemical storage include, super/ultra capacitor storage, flow battery storage, rechargeable battery storage, ultra battery storage, Lithium-ion based batteries, and the like. In other examples, the storage device 94 may employ thermal storage or chemical storage means. The storage device 94 may employ any one or combination of the aforementioned techniques for storing the harvested energy.

The patient support apparatus 30 can have any number of storage devices, including only one storage device. Depending on the situation, any suitable type or different types of storage devices may be utilized by the patient support apparatus 30.

Referring back to FIG. 2, the controller 82 may control, receive signals from, send signals to, and otherwise communicate with the storage device 94. In one embodiment, the controller 82 optionally utilizes control block 100B, interfacing the controller 82 and the storage device 94. Examples of control algorithms implemented by the controller 82 for managing energy stored in the storage device 94 are described below.

Figure 2:
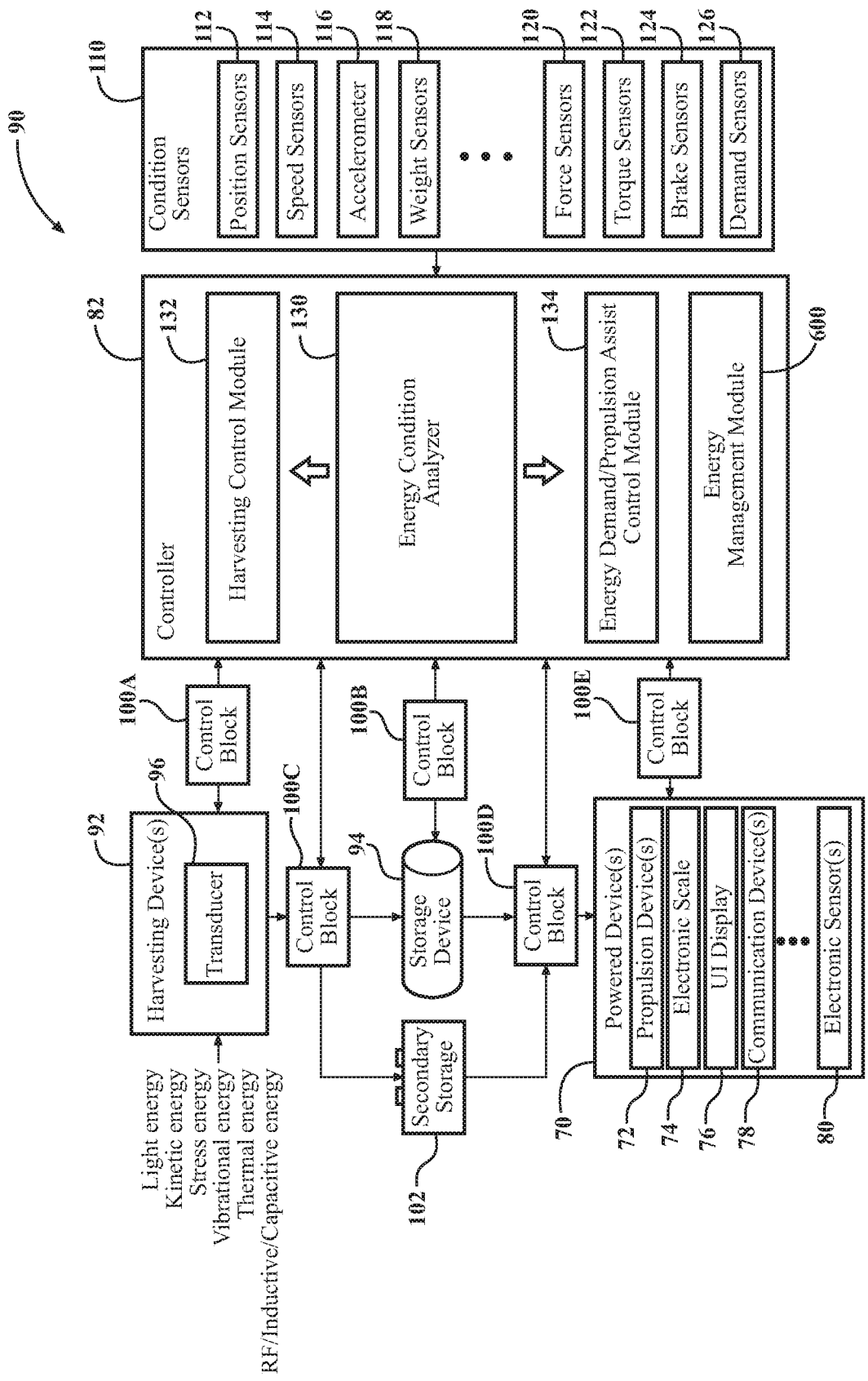
FIG. 2 is a block diagram of an energy harvesting and release system employed by the patient support apparatus.

As shown in FIG. 2, the controller 82 is also coupled to or integrated with one or more condition sensors 110, which measure conditions (e.g., states, circumstances, and/or environmental situations) exhibited by and/or experienced by the patient support apparatus 30. The condition sensor 110 can be any mechanism and/or device that extracts, measures, or calculates condition data. The condition sensor 110 may measure the condition directly (e.g., patient weight), but is not limited to measuring the condition directly. Instead, the condition sensor 110 can observe any situation that may ultimately relate to the condition. Then, the condition can be interpolated, inferred, or determined based on input from the condition sensor 110. Each condition sensor 110 generates analog or digital measurements that are communicated to the controller 82. The controller 82 may receive these measurements via direct or wired connection or via wireless communication. The controller 82, upon receiving these measurements, is configured to make determinations for implementing control algorithms involved with the system 90, which will be described below. The condition sensors 110 are generally attached or coupled to the patient support apparatus 30. However, there may be instances where one or more of the condition sensors 110 are located remote from the patient support apparatus 30. Any of the condition sensors 110 described below may be utilized individually, or in combination.

The condition sensor 110 may be a position sensor 112 being configured to measure a position of the patient support apparatus 30 and/or components of the patient support apparatus 30. For example, the position of the patient support apparatus 30 may be determined by placing a position sensor 112 on one or more of the wheels 58, 60, 62, 64, 66 or the propulsion device 72. The position sensor 112 may determine a position of such components such that the controller 82 can determine either a position or a displacement of the patient support apparatus 30 along the floor surface. Additionally, the position sensor 112 may be utilized in a larger positioning system, such as a GPS system, for determining a location of the patient support apparatus 30. When utilized to determine position of moving components of the patient support apparatus 30, the position sensor 112 may be coupled to any of the side rails 44, 46, 48, 50, headboard 52, footboard 54, operator interfaces 56, wheels 58, 60, 62, 64, 66, support structure 32, base 34, intermediate frame 36, support deck 38, mattress 40, patient support surface 42, direct patient support surface 43, or any combination thereof. Examples of the position sensor 112 include, but are not limited to Hall Effect, capacitive, ultrasonic, piezoelectric, proximity, and encoder sensors, or the like.

The condition sensor 110 may be a speed sensor 114 configured to measure a speed or velocity of the patient support apparatus 30. In one example, the speed sensor 114 is a tachometer or wheel speed sensor for reading a rotational speed of any of the wheels 58, 60, 62, 64, 66. The speed sensor may be a rotary, optical, magnetic, piezo speed sensor, and the like. The speed sensor may also be an accelerometer. The speed sensor 114 may be coupled to any suitable component of the patient support apparatus 30.

The condition sensor 110 may be an accelerometer 116 configured to measure the acceleration forces acting on the patient support apparatus 30. Such acceleration forces may be static (e.g., gravitational acceleration acting on the patient support apparatus 30) or dynamic (e.g., acceleration from movement, shock, or vibration applied to the patient support apparatus 30). The accelerometer 116 may also be utilized to measure acceleration forces acting on components of the patient support apparatus 30, such as the operator interfaces 56, or the like. In one example, the accelerometer 116 is utilized as an (single or multi-axis) inclinometer or a tilt sensor to measure a slope of the floor surface upon which the patient support apparatus 30 rests, with respect to gravity. Examples of the accelerometer 116 may be any type such as, but not limited to, piezoelectric, charge mode piezoelectric, variable capacitance, microelectromechanical systems (MEMS), strain gauge-based, resonance based, and the like. The accelerometer 116 and functions thereof may be like that described in United States Patent Application Pub. No. 2017/0281440, filed on Mar. 28, 2017, entitled "Patient Support Apparatuses With Drive Systems", the entirety of which being hereby incorporated by reference in its entirety.

In another example, the condition sensor 110 may be a weight sensor 118 configured to measure a weight applied to the patient support apparatus 30. The weight may be applied because of a person or object being placed on the patient support apparatus 30. The weight sensor 118 may be coupled to any suitable component of the patient support apparatus 30, such as the support structure 32, base 34, intermediate frame 36, support deck 38, mattress 40, patient support surface 42, direct patient support surface 43, or any combination thereof. Examples of the weight sensor 118 include load cells, strain gauges, and the like.

The condition sensor 110 may be a force sensor 120 configured to measure force applied by a user or any external/environmental source to the patient support apparatus 30, or any components thereof. In one example, the force sensor 120 detects forces applied to any of the side rails 44, 46, 48, 50, headboard 52, and footboard 54. The force sensor 120 may also be coupled to the operator interfaces 56 for sensing forces applied by the user to the operator interfaces 56. Measurements from a plurality of force sensors 120 may be utilized to determine a location of the applied force relative to a reference location on the patient support apparatus 30. The force sensor 120 may be coupled to any other component of the patient support apparatus 30. Examples of the force sensor 120 include, but are not limited to load cells, strain gauges, torque sensors, spring-based sensors, and the like.

In another example, the condition sensor 110 may be a torque sensor 122 configured to measure torque applied to any of the wheels 58, 60, 62, 64, 66, propulsion device 72, or any other moving component of the patient support apparatus 30. The torque sensor 122 may be any suitable type.

The condition sensor 110 may be a brake sensor 124 coupled to the controller 82 wherein the brake sensor 124 is configured to provide measurements that enable the controller 82 to determine whether or not brakes have been applied to any of the wheels 58, 60, 62, 64, 66. Additionally, the controller 82 may determine to what extent brakes are applied. The brake sensor 124 may be any suitable type (e.g., mechanical, electrical, electromechanical) and may measure any suitable parameter (e.g., wheel position) to determine brake activity.

Yet another type of condition sensor 110 is a demand sensor 126. As used herein, the demand sensor 126 is a sensor that measures energy demand of any of the powered devices 70 of the patient support apparatus 30. Measurements from the demand sensor 126 may be utilized by the controller 82 to determine energy consumption over time, min and max energy level parameters, frequency of energy consumption, electrical properties of the demand (e.g., voltage, current, frequency, phase, resonance, etc.), and the like. The controller 82 may comprise any suitable logic or software for converting or transforming measurements from the demand sensor 126 into any suitable unit or form. Examples of the demand sensors 126 include voltmeters, ammeters, power meters, or basic electrical components such as resistors, inductors, capacitors, etc. For wirelessly powered devices 70, energy demand may be measured or acquired using any suitable network component or system or technique. For example, a remote server in wireless communication with the powered device 70 may log power demand data and the controller 82 may wirelessly access the logged data from the remote server. The demand sensor 126 may have any other configuration other than those described herein.

Any of the described components relating to energy harvesting, including, but not limited to, the storage device 94, the motor 72, generator 98, the condition sensors 110, demand sensors 126, and any software or controllers 82 for implementing the control algorithm 500, 506 can be included in any one or more of the wheels 58, 60, 62, 64, including the auxiliary wheel 66. Any of the techniques described herein may be combined with techniques for generating power through wheels of the patient support apparatus, such as those described in U.S. Provisional Patent Application No. 62/576,317, filed on Oct. 24, 2017, entitled "Techniques for Power Transfer Through Wheels of a Patient Support Apparatus," the disclosure of which is hereby incorporated by reference in its entirety.

Figure 4:
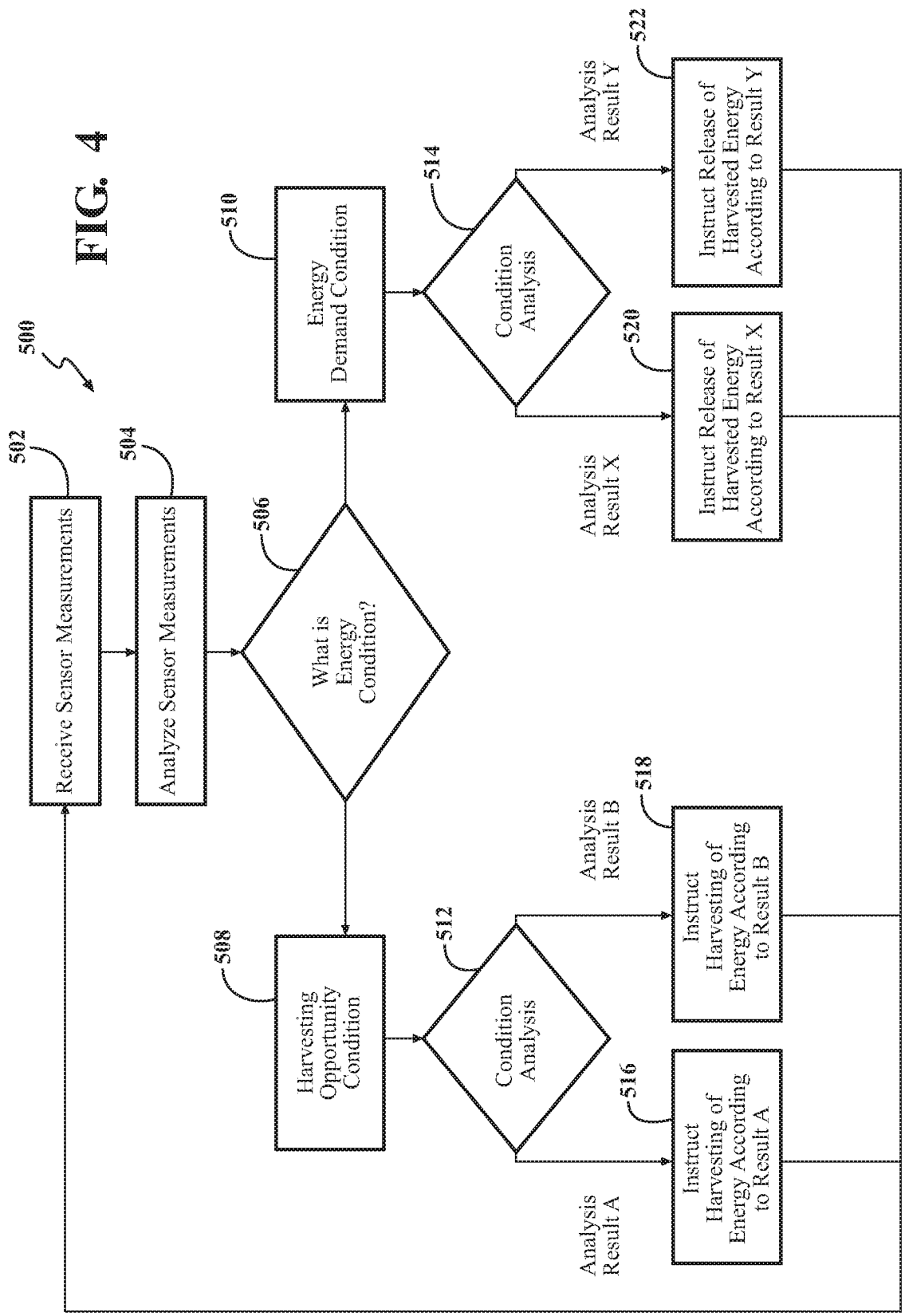
FIG. 4 is a flow chart of one embodiment of the method for determining and analyzing energy conditions (e.g., harvesting opportunity or energy demand/propulsion assist) in the energy harvesting and release system.

As described, the controller 82 is automated to selectively instruct the harvesting device 92 to harvest energy and to selectively instruct release of the harvested energy from the storage device 94 for consumption by the powered device 70. The controller 82 is configured with computer-implemented software, logic, and/or algorithms to make determinations to implement such selective instruction. The method employed by the controller 82, according to one example, is shown in FIG. 4, at 500, the steps of which are described below.

Referring to FIG. 2, the controller 82, in one example, is configured with an energy condition analyzer 130, a harvesting control module 132, and an energy demand control module 134. Although FIG. 2 illustrates these parts of the controller 82 as separate modules, two or more of these parts may be combined into a single module.

At step 502 in the method 500, the energy condition analyzer 130 of the controller 82 receives the measurements from the condition sensors 110. As described, these measurements are received to acquire information about conditions (e.g., states, circumstances, and/or environmental situations) exhibited by and/or experienced by the patient support apparatus 30. These measurements may be received at various points in time, and stored in memory. The energy condition analyzer 130 may access previously stored measurements at any suitable moment and for any purpose described herein.

At step 504, the energy condition analyzer 130 of the controller 82 analyzes the measurements from the condition sensors 110. One main purpose of analyzing these measurements is to determine an energy condition exhibited by and/or experienced by the patient support apparatus 30, or components thereof, for energy management purposes employed by the system 90. The energy condition analyzer 130 may analyze these conditions according to various techniques, algorithms, and using any suitable logic, hardware and/or software. The energy condition analyzer 130 may be coupled to components, such as analog to digital converters (ADC), integrators, differentiators, signal analyzers, or the like. Additionally, the energy condition analyzer 130 may comprise a predictive modeling algorithm, which accesses from memory, predetermined rules, classifications, correlations, relationships, or associations, which are related to the measurements of the various condition sensors 110. The energy condition analyzer 130 may be configured to employ any suitable mathematical or statistical technique, such as regression, interpolation, or extrapolation, for analyzing the measurements for predictive purposes and for estimating relationships from the condition sensors 110 measurements.

At step 506, controller 82, based on analysis of the measurements, classifies the energy condition as either a harvesting opportunity condition (step 508) or an energy demand condition (step 510). Of course, it may be possible that the controller 82 identifies an idle or no-action condition, instead of the harvesting opportunity condition or the energy demand condition.

A harvesting opportunity condition is the energy condition indicating that there is an appropriate and/or timely opportunity for harvesting energy. In other words, the controller 82 determines that energy harvesting is wanted, desired, efficient, optimal, and/or otherwise needed. In other situations, the controller 82 identifies the harvesting opportunity condition based on a look-up table of preset settings relating to the same. The controller 82 is automated to instruct the harvesting device 92 to harvest energy in response to determining the energy condition to be the harvest opportunity condition. This instruction is "automated" in the sense that the controller 82 automatically identifies the harvesting opportunity condition and automatically instructs the harvesting device 92 to harvest energy. This automated process is done without the need for user instruction, selection, or decision making. The automated process is also "selective" in that the controller 82 is selecting specific periods of time when to, or when not to harvest energy. The controller 82 can also customize limits or thresholds for harvesting or not harvesting energy. The controller 82 can also specify quantities or percentages of energy for harvesting or not harvesting.

Examples of harvesting opportunity conditions include, but are not limited to, any one or more of the following: slope of the floor surface being flat or declined, deceleration of the patient support apparatus 30, velocity of the patient support apparatus 30 being constant and/or above a predetermined velocity threshold, the weight applied to the patient support surface 42 being below a predetermined weight threshold, user applied force to the patient support apparatus 30 being below a predetermined force threshold, and power demand of the powered device 70 being below a predetermined power demand threshold.

The energy demand condition is the energy condition indicating that there is demand for release of the harvested energy. For example, the controller 82 may determine that release of harvested energy is desired, efficient, optimal, appropriate, timely, or otherwise needed. The controller 82 is automated to selectively instruct release of the harvested energy from the storage device 94 for consumption by the powered device 70 in response to determining the energy condition to be the energy demand condition. This instruction is "automated" in the sense that the controller 82 automatically identifies the energy demand condition and automatically instructs release of the harvested energy from the storage device 94. This automated process is done without the need for user instruction, selection or decision making. The automated process is also "selective" in that the controller 82 is selecting specific periods of time when to, or when not to instruct release of the harvested energy.

Examples of the energy demand condition include, but are not limited to, any one or more of the following: slope of the floor surface being inclined, acceleration of the patient support apparatus 30, velocity of the patient support apparatus 30 being below a predetermined velocity threshold, user applied force to the patient support apparatus 30 being above a predetermined force threshold, weight applied to the patient support surface 42 being above a predetermined weight threshold, and power demand of the powered device 70 being above a predetermined demand threshold.

Determinations about whether the energy condition is the harvesting opportunity condition or the energy demand condition may be made in real time or near real-time based measurements from the condition sensors 110. Additionally, or alternatively, such determinations may be made in part based on measurements from the condition sensors 110 logged over time generally, or more specifically, logged with respect to location of the patient support apparatus 30 at the time of measurement. Furthermore, the energy condition analyzer 130 may assess past and present measurements from the condition sensors 110 to predict or estimate future energy conditions.

At step 512, the controller 82, and more specifically, the energy condition analyzer 130, performs an analysis of the harvesting opportunity condition. In one embodiment, step 512 is performed subsequent to step 506 (i.e., after determining that the energy condition is the harvesting opportunity condition). In other embodiments, steps 506 and 512 may be combined such that the controller 82 performs all such analysis at one time. This may be considered a tuning or calibration of the harvesting opportunity condition to provide optimal harvesting given the situation. Specific details about such analysis are described below.

Results from the condition analysis of step 512 vary depending on a variety of factors, such as the measurements from the condition sensors 110 and the type of analysis employed. In one example, the controller 82, at step 516, instructs harvesting of energy according to a first result (result A) and the controller 82, at step 518, instructs harvesting of energy according to a second result (result B). Results A and B are produced at different times and comprise different instructions on how, when, and/or where to harvest energy. For example, these instructions may dictate a quantity of energy to harvest, a duration or specific times during which to harvest energy, a frequency or rate at which energy is harvested, which harvesting devices 92 to use to harvest energy, when to use certain harvesting devices 92, how much energy to harvest from harvesting devices 92 (e.g., range from 0-100%), and the like. Additionally, the controller 82 may determine, based on the condition analysis, whether and how to store harvested energy to the storage device 94. Results from the analysis of step 512 may vary depending on other factors or parameters not specifically described herein.

The controller 82 communicates the result of the analysis 512 (e.g., either result A or result B) to the harvesting control module 132, which instructs the harvesting device 92 to harvest energy. The harvesting control module 132 may execute such instruction by optionally utilizing control block 100A, and may do so using any suitable communication methods or signal control. In one example, the harvesting device 92 is in an inactive state and the harvesting control module 132 subsequently activates the harvesting device 92 to enable the harvesting device to harvest energy. In another instance, the harvesting device 92 may continuously harvest energy, however, the controller 82 may instruct the control block 100C to control or otherwise limit the amount of harvested energy that may be passed for storage to the storage device 94.

At step 514, the controller 82, and more specifically, the energy condition analyzer 130, performs an analysis of the energy demand condition. In one embodiment, step 514 is performed subsequent to step 506 (i.e., after determining that the energy condition is the energy demand condition). In other embodiments, steps 506 and 514 may be combined such that the controller 82 performs all such analysis at one time. This may be considered a tuning or calibration of the energy demand condition to provide optimal release of harvested energy depending on the situation. Specific details about such analysis are described below.

With respect to the energy demand condition, results from the condition analysis of step 514 vary depending on a variety of factors, such as the measurements from the condition sensors 110 and the type of analysis employed. In one example, as shown at step 520 in FIG. 4, the controller 82 instructs release of the harvested energy according to a first result (result X) and the controller 82, at step 522, instructs release of harvested energy according to a second result (result Y). Results X and Y are produced at different times and comprise different instructions on how, when, and/or where to release harvested energy. For example, these instructions may dictate a quantity of harvested energy to release, a duration or specific times during which to release harvested energy, a frequency or rate at which harvested energy is released, and the like. Additionally, the controller 82 may determine, based on the analysis, whether and how to release harvested energy from the storage device 94. Results from the analysis of step 514 may vary depending on other factors or parameters not specifically described herein.

The controller 82 communicates the result of the analysis 514 (e.g., either result X or result Y) to the energy demand control module 134, which instructs the storage device 94 to release the harvested energy. The energy demand control module 134 may execute such instruction by utilizing control block 100D, and may do so using any suitable communication methods or signal control.

There may be situations where the controller 82 simultaneously or concurrently identifies the harvesting opportunity and energy demand conditions and provides simultaneous or concurrent control over the respective components described herein to implement energy harvesting and release of harvested energy. In such situations, the controller 82 may collaboratively tune or calibrate the analysis at steps 506, 514 and 516 to allow for minimal impact to user effort mixed with the maximum regenerative opportunities, thereby harmonizing harvesting and energy demand, for any given situation.

In some instances, the powered device 70 may continuously demand harvested energy, however, the controller 82 may instruct the control block 100D (on the storage device 94 side) to control or otherwise limit the amount of harvested energy that may be released to the powered device 70. On the other hand, the controller 82 may utilize control block 100E to instruct, and otherwise control the amount of harvested energy (on the powered device 70 side) that may be consumed by the powered device 70.

Furthermore, in some instances, the powered device 70 may not be actively consuming energy at the time that the energy demand condition is identified, or at the time the instructions (e.g., 520 or 522) are executed. Rather, the energy demand condition identifies that the powered device 70 should receive in the near future harvested energy for consumption. This may be thought of as activating the powered device 70 with the harvested energy. In other instances, the powered device 70 may be actively consuming energy at the time that the energy demand condition is identified, or at the time the instructions (e.g., 520 or 522) are executed. In these situations, the energy demand condition identifies that the powered device 70 immediately requires harvested energy for consumption. For example, the powered device 70 may be in a situation where power loss is imminent, and the harvested energy is needed to maintain power to the device 70.

FIGS. 5-10 illustrate charts of examples of how measurements from the condition sensors 110 are analyzed by the controller 82, and more specifically, the energy condition analyzer 130, to identify the energy condition (step 506) and to analyze the harvesting opportunity condition or energy demand condition (steps 512, 514). In each of FIGS. 5-10, a "regeneration region" and an "assist region" are illustrated for each respective condition sensor 110 measurement. The respective condition sensor 110 measurement is illustrated using a bold line. The regeneration region defines a region where there is an opportunity for energy harvesting. The assist region defines a region where there is a demand for release of harvested energy.

These regions are defined by threshold values, or ranges defining minimum or maximum lines, with respect to the respective condition sensor 110 measurement. The threshold value or range may be static and stored in memory in the controller 82 or may be dynamically calculated and updated "on the fly" by the controller 82, for example, based on any of the factors described above with respect to the condition analysis steps of 506, 512 or 514. Although the regeneration and assist regions in the Figures have linearly defined thresholds, it is to be appreciated that the thresholds may be non-linear, and therefore, may vary over time. Furthermore, the controller 82 may dynamically swap the regeneration and assist regions to provide an opposite correlation between the same. For example, if increases in the condition sensor 110 measurements would normally enter the assist region, such swapping may be dynamically performed to make such increases enter the regeneration region, and vice versa. The controller 82 may do so when there are sudden changes between harvesting conditions and energy release conditions.

In general, when the respective condition sensor 110 measurement enters the regeneration region by crossing the threshold, the opportunity for energy harvesting is logged by the controller 82. Similarly, when the respective condition sensor 110 measurement enters the assist region by crossing the threshold, the demand for release of harvested energy is logged by the controller 82. The controller 82 continues to log measurement data over time or distance and continues to compare the same to the respective regions.

In one embodiment, the controller 82 instructs the harvesting device 92 to harvest energy starting immediately from the moment the respective condition sensor 110 measurement enters the regeneration region and ceases such instruction immediately from the moment the respective condition sensor 110 measurement exits the regeneration region. In another embodiment, the controller 82 may execute a wait and check cycle (e.g., every 100 ms) to monitor the respective condition sensor 110 measurement and instruct the harvesting device 92 to harvest energy after determining that the respective condition sensor 110 measurement has been anywhere in the regeneration region for a predetermined period of time (e.g., at least 1 second) or after determining that the respective condition sensor 110 measurement is at a predetermined value above the threshold (e.g., at least 25% above threshold). In other examples, the controller 82 may disregard the harvesting opportunity condition if the respective condition sensor 110 measurement enters the regeneration region for a negligible amount of time, such as a measurement spike.

Similarly, the controller 82 may instruct release of the harvested energy starting immediately from the moment the respective condition sensor 110 measurement enters the assist region and ceases such instruction immediately from the moment the respective condition sensor 110 measurement exits the assist region. In another embodiment, the controller 82 may execute the wait and check cycle to monitor the respective condition sensor 110 measurement and instruct the release of the harvested energy after determining that the respective condition sensor 110 measurement has been anywhere in the assist region for a predetermined period of time or after determining that the respective condition sensor 110 measurement is at a predetermined value above the threshold. In other examples, the controller 82 may disregard the energy demand condition if the respective condition sensor 110 measurement enters the assist region for a negligible amount of time, such as a measurement spike.

In FIGS. 5-10, the area between the respective condition sensor 110 measurement and the threshold value of the respective regeneration region or assist region is highlighted. This highlighted area is illustrated to demonstrate additional information relevant to the analysis (506, 512, 514). For example, the highlighted area may indicate a scalar value, magnitude, or weight to apply to the energy condition. For instance, the greater the highlighted area the greater the opportunity for harvesting energy or the greater the demand for release of harvested energy. Similarly, the lesser the highlighted area the lesser the opportunity for harvesting energy or the lesser the demand for release of harvested energy.

Additionally, the highlighted area may be computed for determining or deriving the actual energy harvested or actual harvested energy released. Such computation may be performed using a combination of measurements from the condition sensors 110 or from predetermined data known about the patient support apparatus 30. For example, the controller 82 may compute actual kinetic energy (i.e., $KE=1/2\ mv^2$) knowing the mass of the patient support apparatus 30 and the velocity measurement from the speed sensor 114.

Sometimes there is a desire to harvest more energy than to release such harvested energy. This desire is due to many factors, such as maintaining a surplus of harvested energy, preventing loss of power to powered devices 70, and because of practical limitations arising from the reality that harvested energy is easier to consume than to harvest. To illustrate this preference, the highlighted area for each regeneration region is greater than the highlighted area for the respective assist region for each respective condition sensor 110 measurement of FIGS. 5-10. However, there may be situations when the opposite may occur depending, for example, on any of the factors described above with respect to the condition analysis steps of 506, 512 or 514.

The condition sensor 110 measurements may be utilized individually, and/or in combination to aide the controller 82 in performing the analysis (506, 512, 514). For example, the controller 82 may apply a weighting factor to each condition sensor 110 measurement depending for example, on their respective measurement values or whether their respective measurement values enter the regeneration region or assist region. The controller 82 can combine these weights into a weighted sum to make more general determinations about harvesting opportunities or energy demand conditions than are otherwise determinable using each respective condition sensor 110 measurement alone. For example, the energy condition analyzer 130 may apply the aforementioned mathematical or statistical technique to estimate relationships between the condition sensors 110 measurements.

The examples shown in FIGS. 5-10 are described in detail below with respect to a specific implementation regarding propulsion assistance. For simplicity, only certain condition sensor 110 measurements are shown in FIGS. 5-10. It is to be appreciated that additional condition sensor 110 measurements may be similarly represented.

III. Propulsion Assistance Techniques

With reference to FIGS. 3, and 5-12, the system 90 and method 500 described above may be utilized, in one embodiment, to provide propulsion assistance to aide in mobility of the patient support apparatus 30.

In this embodiment, the powered device 70 is the propulsion device 72. As described, the propulsion device 72 is configured to apply force or torque to propel the patient support apparatus 30 in variable directions and according to variable speed and acceleration. The harvesting device 92 and storage device 94 may be any of those described above, or any of the additional examples described below.

In this embodiment, the harvesting opportunity condition is the same as described above, however, the energy demand condition may be more specifically understood as a propulsion assist condition, which signifies that the patient support apparatus 30 is in demand for the release of harvested energy for consumption by the propulsion device 72 to assist in moving the patient support apparatus 30. Consumption of harvested energy by the propulsion device 72 results in a corresponding assistance in movement of the patient support apparatus 30. In other words, the propulsion device 72 provides a "boost" to aide the user in pushing the patient support apparatus 30 pursuant to propulsion assist condition identification and instruction.

The propulsion assist condition may be one or more conditions that trigger propulsion assistance and the corresponding assistance in movement may be tailored to the characteristics of the propulsion assist condition. The propulsion assist condition may relate to whether the patient support apparatus 30 is being pushed or pulled, what direction the patient support apparatus 30 is intending to move, environmental conditions (such as floor slope, bumps), and the like. For instance, the propulsion assistance condition may be backing the patient support apparatus 30 into an elevator. Backing into the elevator may trigger a reduction or limiting of movement assistance to avoid unwanted impact and injury because the caregiver normally backs into the elevator slowly. On the other hand, the propulsion assistance condition may be when pushing the patient support apparatus 30 out of an elevator. Pushing out of the elevator may trigger "full" movement assistance because the caregiver normally exits the elevator at any speed. Furthermore, movement assistance may be tailored to enable the patient support apparatus 30 to roll over an edge of the elevator when exiting the elevator, or the. Examples of the propulsion assist condition and corresponding assistance in movement will be fully understood in view of the examples described below.

Figure 5:
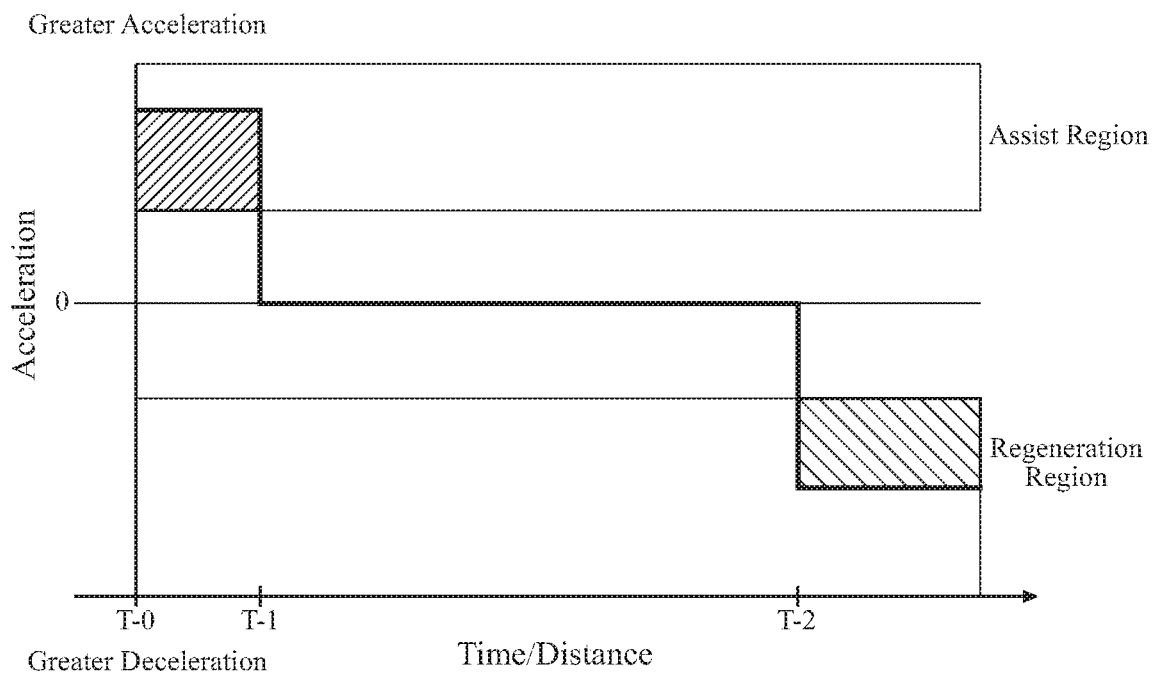
FIG. 5 is a sample chart of accelerometer measurements depicting acceleration of the patient support apparatus over time, and which are utilized by the method of FIG. 4 to detect harvesting opportunity conditions or energy demand/propulsion assist conditions.

FIGS. 5-10 are now described with reference to this propulsion assistance embodiment. The chart of FIG. 5 illustrates an example of acceleration of the patient support apparatus 30 over time as measured by the accelerometer 116. As shown, at time point T-0, the acceleration initially starts high, indicating, for example, a start-up situation where the user is applying acceleration to the patient support apparatus 30 to move the patient support apparatus 30 from an at-rest position. This accelerometer 116 measurement instantly enters the assist region. If the accelerometer 116 measurement is analyzed in isolation, the controller 82 identifies the propulsion assist condition and instructs release of the harvested energy to the propulsion device 72 to provide a boost. In FIG. 5, at T-1, acceleration goes to zero for a period until T-2, wherein the accelerometer 116 measurement is in neither the assist region nor the regeneration region. The propulsion assistance may be executed during any period between T-0 and T-1, and even after T-1, if desired. At T-2, the patient support apparatus 30 decelerates and the accelerometer 116 measurement enters the regeneration region. If the accelerometer 116 measurement is analyzed in isolation, the controller 82 identifies the harvesting opportunity condition and instructs the harvesting device 92 to harvest energy. Such harvesting may be executed during any period at or after T-2, and may continue until the accelerometer 116 measurement exits the regeneration region or until alternative conditions are detected.

In the example above, acceleration above the threshold is associated with the assist region because of an assumption that a user is pushing the patient support apparatus 30 during acceleration, and therefore, needs assistance. Similarly, deceleration below the threshold is associated with the regeneration region because of an assumption that the user is slowing down the patient support apparatus 30 during deceleration, and therefore, energy that would otherwise be lost may be harvested. Of course, depending on the assumption, and situation, acceleration may be associated with the harvesting opportunity condition, such as going down a slope, and deceleration may be associated with the propulsion assist condition, such as going up a slope. Furthermore, FIG. 5 provides just one example of the assist and regeneration regions. Of course, depending on the situation or configuration, the assist and regeneration regions may be swapped, and may be of any suitable range, such as extending to, or surrounding, the zero acceleration line.

Figure 6:
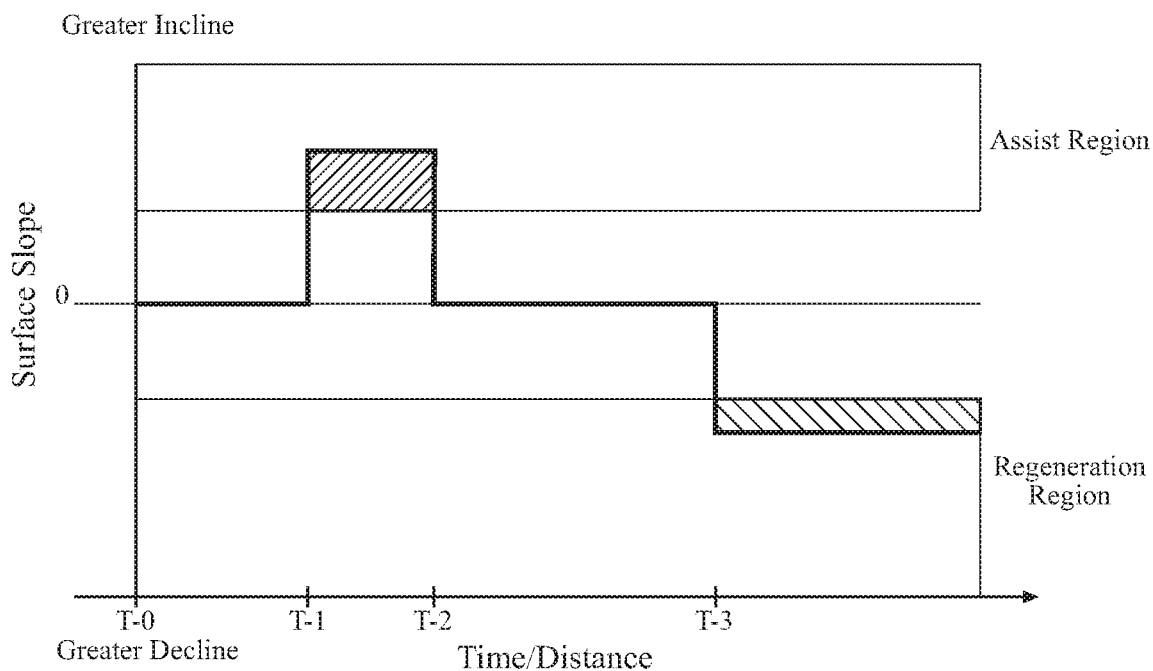
FIG. 6 is a sample chart of accelerometer measurements depicting a slope of the surface on which the patient support apparatus is situated over time, and which are utilized by the method of FIG. 4 to detect harvesting opportunity conditions or energy demand/propulsion assist conditions.

The chart of FIG. 6 illustrates an example of changes over time in surface slope of the surface upon which the patient support apparatus 30 rests, as measured by the accelerometer 116 (being utilized as an inclinometer). As shown, at time point T-0, the slope initially starts flat, and then begins to incline at T-1 during which the accelerometer 116 measurement enters the assist region. If the accelerometer 116 measurement is analyzed in isolation, the controller 82 identifies the propulsion assist condition and instructs release of the harvested energy to the propulsion device 72 to provide a boost. At T-2, slope goes back to flat for a period until T-3, wherein the accelerometer 116 measurement is in neither the assist region nor the regeneration region. The propulsion assistance may be executed during any period between T-1 and T-3. At T-3, the slope declines and the accelerometer 116 measurement enters the regeneration region. If the accelerometer 116 measurement is analyzed in isolation, the controller 82 identifies the harvesting opportunity condition and instructs the harvesting device 92 to harvest energy. Such harvesting may be executed during any period at or after T-3, and may continue until the accelerometer 116 measurement exits the regeneration region or until alternative conditions are detected.

In the example above, inclining slope above the threshold is associated with the assist region because of an assumption that a user pushing the patient support apparatus 30 on an incline needs assistance. Similarly, declining slope below the threshold is associated with the regeneration region because of an assumption that energy that would otherwise be lost while the patient support apparatus 30 is moving down a decline slope, and thus such energy should be harvested. Furthermore, FIG. 6 provides just one example of the assist and regeneration regions. Of course, depending on the situation or configuration, the assist and regeneration regions may be swapped, and may be of any suitable range, such as extending to, or surrounding, the zero surface slope line.

Figure 7:
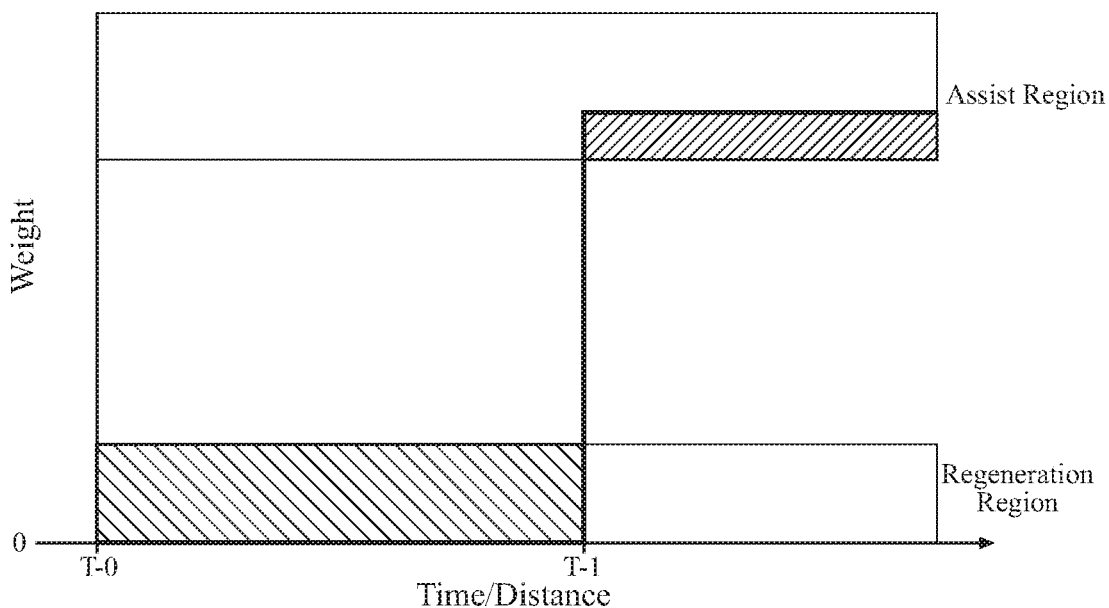
FIG. 7 is a sample chart of weight sensor measurements depicting weight applied to the patient support apparatus over time, and which are utilized by the method of FIG. 4 to detect harvesting opportunity conditions or energy demand/propulsion assist conditions.

The chart of FIG. 7 illustrates an example of changes over time in weight applied to the patient support apparatus 30, as measured by the weight sensor 118. As shown, at time point T-0, there is no additional weight applied to the patient support apparatus 30 beyond the predetermined weight of any components (e.g., mattress 40, etc.) of the patient support apparatus 30. At T-0, the weight sensor 118 measurement immediately starts in the regeneration region. If the weight sensor 118 measurement is analyzed in isolation, the controller 82 identifies the harvesting opportunity condition and instructs the harvesting device 92 to harvest energy until T-1, when weight is applied resulting in the weight sensor 118 measurement entering the assist region. This applied weight may be from, for example, a heavy or light patient, being placed upon the patient support apparatus 30. If the weight sensor 118 measurement is analyzed in isolation, the controller 82 identifies the propulsion assist condition and instructs release of the harvested energy to the propulsion device 72 to provide a boost. The propulsion assistance may be executed during any period at or after T-1 during which the patient continues to be placed on the patient support apparatus 30.

In the example above, the system 90 may proportionally increase the regenerative capabilities in response to decreases in weight. Lesser or zero applied weight below the threshold is associated with the regeneration region because of an assumption that a user is not likely to need assistance when no patient is placed on the patient support apparatus 30, and thus energy should be harvested. Similarly, applied weight beyond the threshold is associated with the assist region because of an assumption that a user pushing the patient support apparatus 30 with a patient placed thereupon is likely to need assistance.

Figure 8:
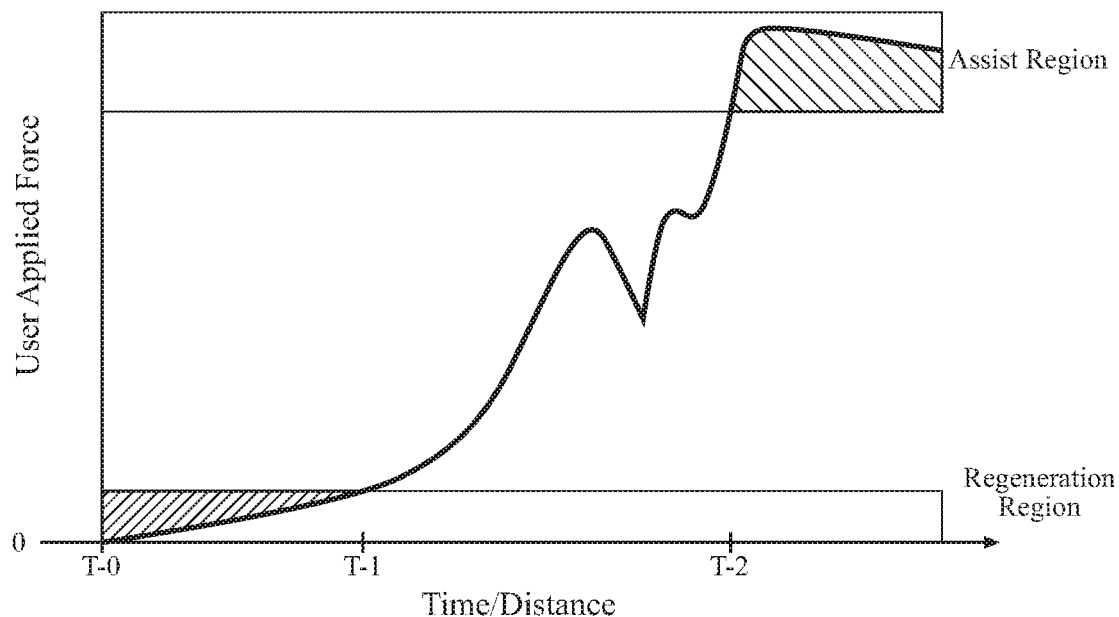
FIG. 8 is a sample chart of force sensor measurements depicting user-applied force to the patient support apparatus over time, and which are utilized by the method of FIG. 4 to detect harvesting opportunity conditions or energy demand/propulsion assist conditions.

The chart of FIG. 8 illustrates an example of changes over time in user-applied force to the patient support apparatus 30, as measured by the force sensor 120. As shown, at time point T-0, the user applied force beings to increase and is within the regeneration region. If the force sensor 120 measurement is analyzed in isolation, the controller 82 identifies the harvesting opportunity condition and instructs the harvesting device 92 to harvest energy. Energy harvesting may be executed during any period between T-0 and T-1 in this example. At T-1, the force sensor 120 measurement continues to increase, but has exceeded the threshold of the regeneration region. Between T1- and T-2, the user continues to apply variable forces, but the force sensor 120 measurement is in neither the regeneration region nor the assist region. At T-2, the user is applying significant force, and the force sensor 120 measurement enters the assist region. If the force sensor 120 measurement is analyzed in isolation, the controller 82 identifies the propulsion assist condition and instructs release of the harvested energy to the propulsion device 72 to provide a boost. Such propulsion assistance may be executed during any period at or after T-2, and may continue until the force sensor 120 measurement exits the assist region or until alternative conditions are detected.

In the example above, user applied force above the threshold is associated with the assist region because of an assumption that a user is pushing the patient support apparatus 30 in the start-up situation where the user is applying greater forces to move the patient support apparatus 30 from the at-rest position. The controller 82 may take into account that the applied force was previously zero to identify the start-up situation. On the other hand, user applied force above zero but below the threshold is associated with the regeneration region because of an assumption that the user is applying some force that can be harvested. In other examples, the regeneration region may extend up to the threshold associated with the assist region and may even overlap the assist region on the assumption that user applied force can be harvested regardless of the magnitude of the applied force.

Figure 9:
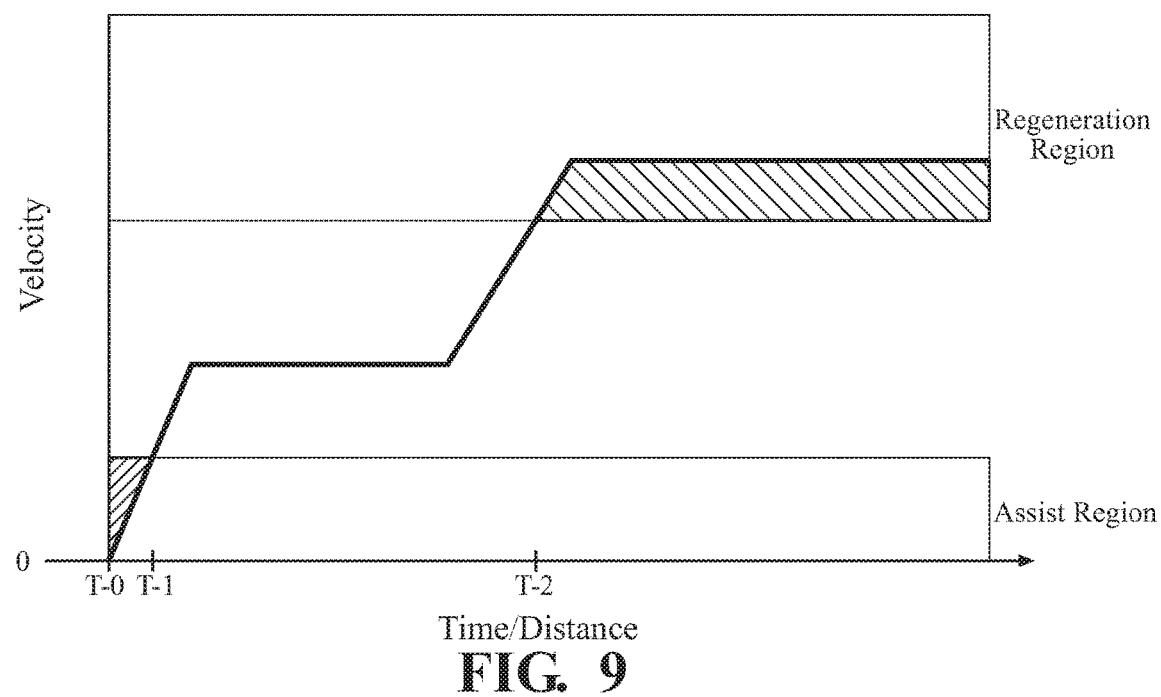
FIG. 9 is a sample chart of speed sensor measurements depicting velocity of the patient support apparatus over time, and which are utilized by the method of FIG. 4 to detect harvesting opportunity conditions or energy demand/propulsion assist conditions.

The chart of FIG. 9 illustrates an example of changes over time in velocity of the patient support apparatus 30, as measured by the speed sensor 114. As shown, at time point T-0, the velocity beings to increase and is within the assist region. If the speed sensor 114 measurement is analyzed in isolation, the controller 82 identifies the propulsion assist condition and instructs release of the harvested energy to the propulsion device 72 to provide a boost. At T-1, the speed sensor 114 measurement continues to increase, but has exceeded the threshold of the assist region. Between T1- and T-2, the velocity changes and gradually increases, but the speed sensor 114 measurement is in neither the assist region nor the regeneration region. The propulsion assistance may be executed during any period between T-0 and T-1. At T-2, patient support apparatus 30 exhibits velocity great enough that the speed sensor 114 measurement enters the regeneration region. If the speed sensor 114 measurement is analyzed in isolation, the controller 82 identifies the harvesting opportunity condition and instructs the harvesting device 92 to harvest energy. Such harvesting may be executed during any period at or after T-2, and may continue until the speed sensor 114 measurement exits the regeneration region or until alternative conditions are detected.

In the example above, velocity above zero but below the threshold is associated with the assist region because of an assumption that a user is pushing the patient support apparatus 30 in the start-up situation. The controller 82 may take into account that the velocity was previously zero to identify the start-up situation. Similarly, velocity above the threshold is associated with the regeneration region because of an assumption that the velocity of the patient support apparatus 30 is great enough that the user likely does not need assistance. Of course, depending on the assumption, and situation, greater velocity may be associated with the propulsion assist condition and lesser velocity may be associated with the harvesting opportunity condition. The controller 82 may also take into account how long the velocity remains constant and in the regeneration region. Additionally, the speed sensor 114 measurement may be used to predict or estimate weight applied to the patient support apparatus 30.

Figure 10:
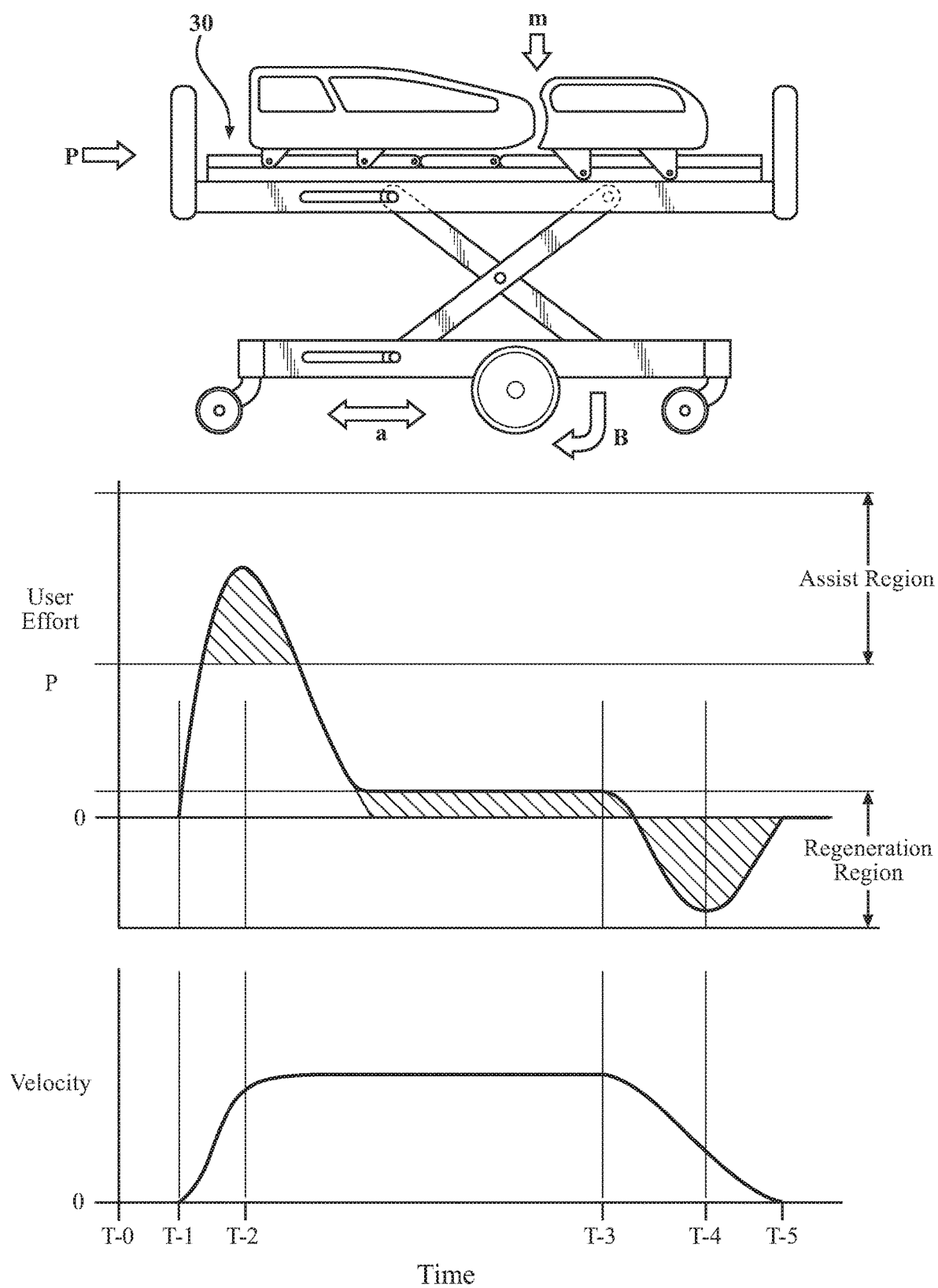
FIG. 10 is a sample chart depicting an example of user effort needed to move the patient support apparatus and velocity of the patient support apparatus over time, as well as depicting regeneration opportunities and propulsion assistance relative to the user effort.

FIG. 10 illustrates an example of how user effort "P" applied to the patient transport apparatus 30 changes in comparison to propulsion assistance and regeneration. More specifically, in this example, the user effort P is the effort required by the user to physically move the patient support apparatus 30 over the floor surface. In general, user effort P decreases when propulsion assistance is activated or increased and user effort P increases when propulsion assistance is not activated or reduced. In FIG. 10, a mass m is applied to the patient support apparatus 30 and represents the mass of the patient. Acceleration or deceleration of the patient transport apparatus is identified as a. Propulsion assistance applied to the wheel of the patient support apparatus 30 is identified as B. The user effort P is shown being applied to a headboard of the patient support apparatus 30. In FIG. 10, a chart of the user effort P is shown over time. Additionally, a chart of the velocity of the patient support apparatus 30 is shown corresponding in time with the chart of the user effort P.

As shown, at time point T-0, the velocity and the user effort are zero and no condition is detected. This may be a situation where the patient support apparatus 30 is idle. At T-1, the user begins to push the patient support apparatus 30 from the at-rest position. As such, the user effort P and the velocity of the patient support apparatus 30 both begin to increase. Eventually, between T-1 and T-2, the user effort P increases enough to enter the assist region. In this example, detection user effort P relative to the assist region is based on detected increases of velocity using the controller 82. At T-2, propulsion assistance is triggered by the controller 82 to reduce user effort P progressively. The extent of propulsion assistance may be proportional to the extent of the user effort P breaching the assist region. Here, propulsion assistance gradually increases the velocity until a steady velocity is reached, i.e., between T-2 and T-3. Of course, propulsion assistance may modify the velocity in manners other than shown in FIG. 10. Since the velocity of the patient support apparatus 30 shortly after T-2 is handled, in pertinent part, by propulsion assistance, the use effort P plummets until the user effort P exits the assist region thereby disabling propulsion assistance.

Because propulsion assistance helped to achieve a steady velocity after T-2, the user effort P needed to keep the patient support apparatus 30 moving is reduced. Between T-2 and T-3, the user effort P falls to a constant rate to maintain the constant velocity. More specifically, the user effort P falls to a level low enough to breach the regeneration region. In this example, detection user effort P relative to the regeneration region is based on the controller 82 detecting constant velocity after a threshold amount of time has exceeded. Of course, the controller 82 may trigger regeneration according to situations other than the situation of this example. Energy continues to be harvested from the moment the user effort P enters the regeneration region. Shortly after T-3, the accelerometer 116 detects a gradually declining surface slope and the user gradually decelerates the patient support apparatus 30 by applying a negative user effort throughout the decline, to maintain control. As such, the user effort P falls below the zero line. Opportunity for harvesting energy exists even though there is negative user effort and the extent of regeneration increases during the decline slope. At T-4, the decline slope stops and the floor surface becomes flat thereby increasing user effort P, i.e., towards the zero line. Eventually, the patient support apparatus 30 reaches an at-rest state at T-5 and the velocity and user effort P both reach zero. Even though the user effort P at T-5 remains in the regeneration region, the patient support apparatus 30 is at-rest, and there are no harvesting conditions detected by the controller 30. Regeneration is paused until a later point in time where harvesting conditions may exist. It should be appreciated that FIG. 10 provides one example of how user effort "P" applied to the patient transport apparatus 30 changes in comparison to propulsion assistance and regeneration. Those skilled in the art appreciate that numerous situations and propulsion and regeneration conditions may exist for various situations other than that shown in FIG. 10.

Using such propulsion assistance, the techniques described are able to significantly improve user experience and mobility of the patient support apparatus 30. These techniques dynamically reduce mobility challenges in various high effort situations, such as start-up, moving uphill, turning, moving a heavy load, moving along a high-friction surface (e.g., carpet), or the like. As an added benefit, the system 90 is closed-loop thereby requiring no input from the user. That is, the controller 82 is automated to dynamically instruct harvesting and propulsion assistance on-the-fly, thereby relieving burden on the user of having to manually decide when a high-effort situation exists and of having to manually activate and deactivate any support drive systems. It should be appreciated that in some embodiments, the system 90 may additionally provide the user with a user input device configured to manually select when to harvest energy or when to release energy, e.g., when propulsion assistance is desired.

Furthermore, as shown in the example of FIG. 10, the propulsion assist feature helps with a portion of the work during peak demands rather than all the time or doing all the work. This selectivity enables the system 90 to be robust, efficient, and simplified as compared with permanently active drive support systems.

Figure 11:
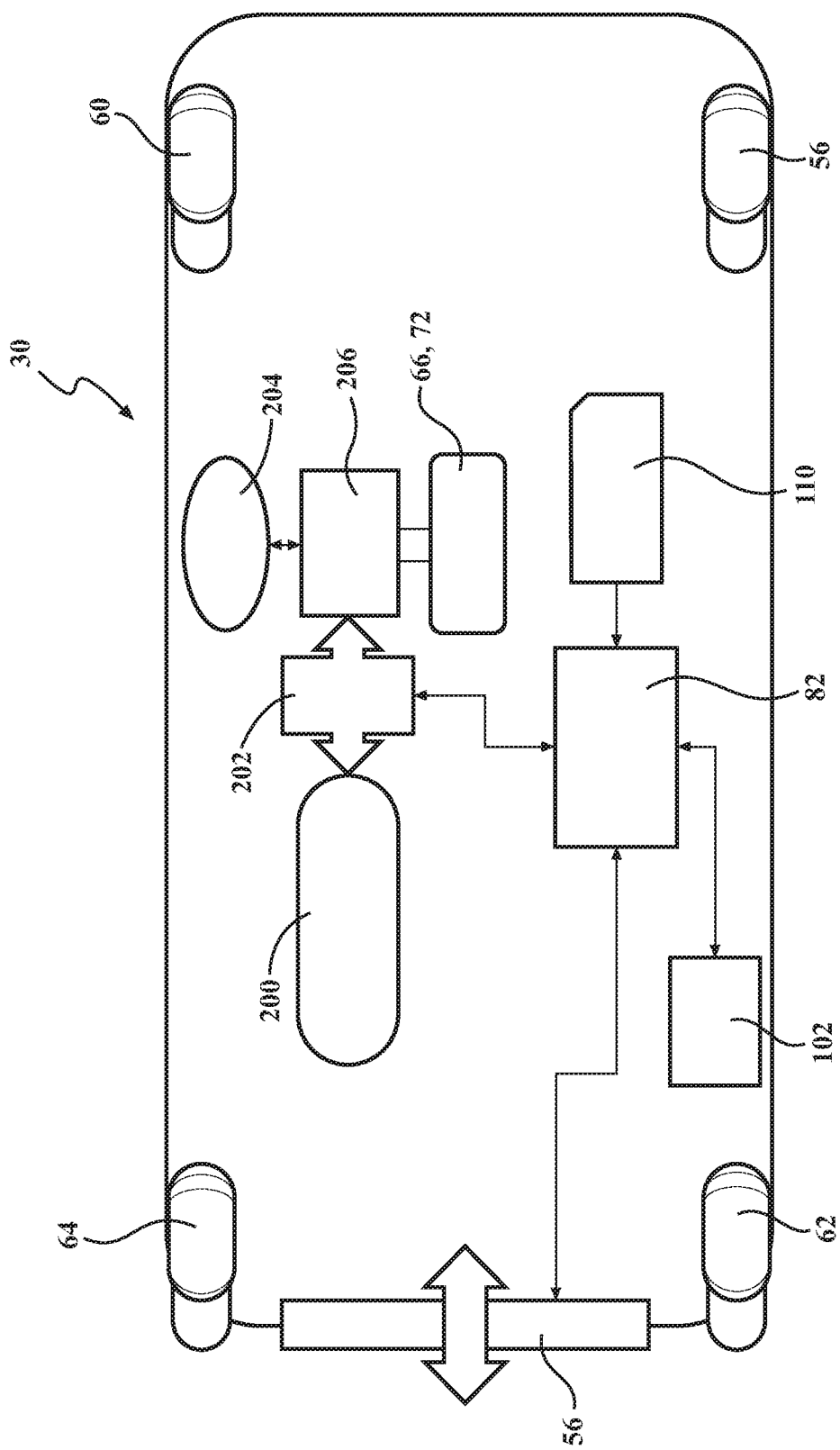
FIG. 11 is a hybrid diagram of components of the patient support apparatus and components of the energy harvesting and release system, and more specifically the system being configured to provide energy harvesting and propulsion assistance to the patient support apparatus using hydraulic based devices.

One embodiment of the patient support apparatus 30 having the energy harvesting and release system 90, and more specifically, releasing harvested energy for propulsion assistance, is shown in FIG. 11. In FIG. 11, the harvesting device 92 and storage device 94 are implemented using hydraulic devices. Specifically, the patient support apparatus 30 comprises a hydraulic accumulator 200, a valve manifold 202, a hydraulic reservoir 204 (e.g., comprising internal valves and a propulsion pump), a power transfer module 206 (e.g., a hydraulic chamber for hydraulic to mechanical transfer), and the propulsion device 72 (e.g., the drive wheel 66). The valve manifold 202 is coupled between the hydraulic accumulator 200 and the power transfer module 206. The power transfer module 206 is coupled between the hydraulic reservoir 204 and the wheel 66. The controller 82 is coupled to and controls the valve manifold 202. The valve manifold 202 provides selective communication between the power transfer module 206 and the hydraulic accumulator 200. The valve manifold 202 may comprise a solenoid valve having a variable orifice. The hydraulic accumulator 200 may comprise a cylinder and a piston slidable in the cylinder. The cylinder comprises a front chamber in selective communication with the power transfer module 206 via the valve manifold 202. The cylinder also comprises a rear chamber having a volume of pressurized air. This volume of pressurized air acts as a spring.

When energy harvesting is instructed pursuant to determination of the harvesting opportunity condition, the controller 82 closes valves in the hydraulic reservoir 204 and the valve manifold 202 trapping the hydraulic fluid, which is an incompressible fluid, in the power transfer module 206. The controller 82 then selectively opens the valve manifold 202 enabling the hydraulic fluid to pass from the power transfer module 206 to the hydraulic accumulator 200. When the drive wheel 66 rotates, vibrates, or otherwise moves, the power transfer module 206 is actuated in a manner gradually causing air pressure to build up in the hydraulic accumulator 200. This build-up of air pressure corresponds to the harvested energy. The valve manifold 202 thereafter may be closed to seal the pressurized air for later release.

When propulsion assistance is to be implemented pursuant to determination of the propulsion assist condition, the controller 82 (keeping valves in the hydraulic reservoir 204 closed), opens the valve manifold 202 causing air depressurization and reverse actuation of the power transfer module 206, in turn, effecting propulsion of the drive wheel 66. In other embodiments, the controller 82 closes the valve manifold 202 and controls the valves and pump in the hydraulic reservoir 204 to enable hydraulic fluid to be pulled from the hydraulic reservoir 204 into the power transfer module 206. As a result, the power transfer module 206 effectuates hydraulic to mechanical motion to the drive wheel 66. Once the desired or instructed propulsion is executed, the valve in the hydraulic reservoir 204 is closed. Hydraulic based propulsion assistance and energy harvesting may be implemented in ways other than those described herein and using other components not specifically recited herein.

Figure 12:
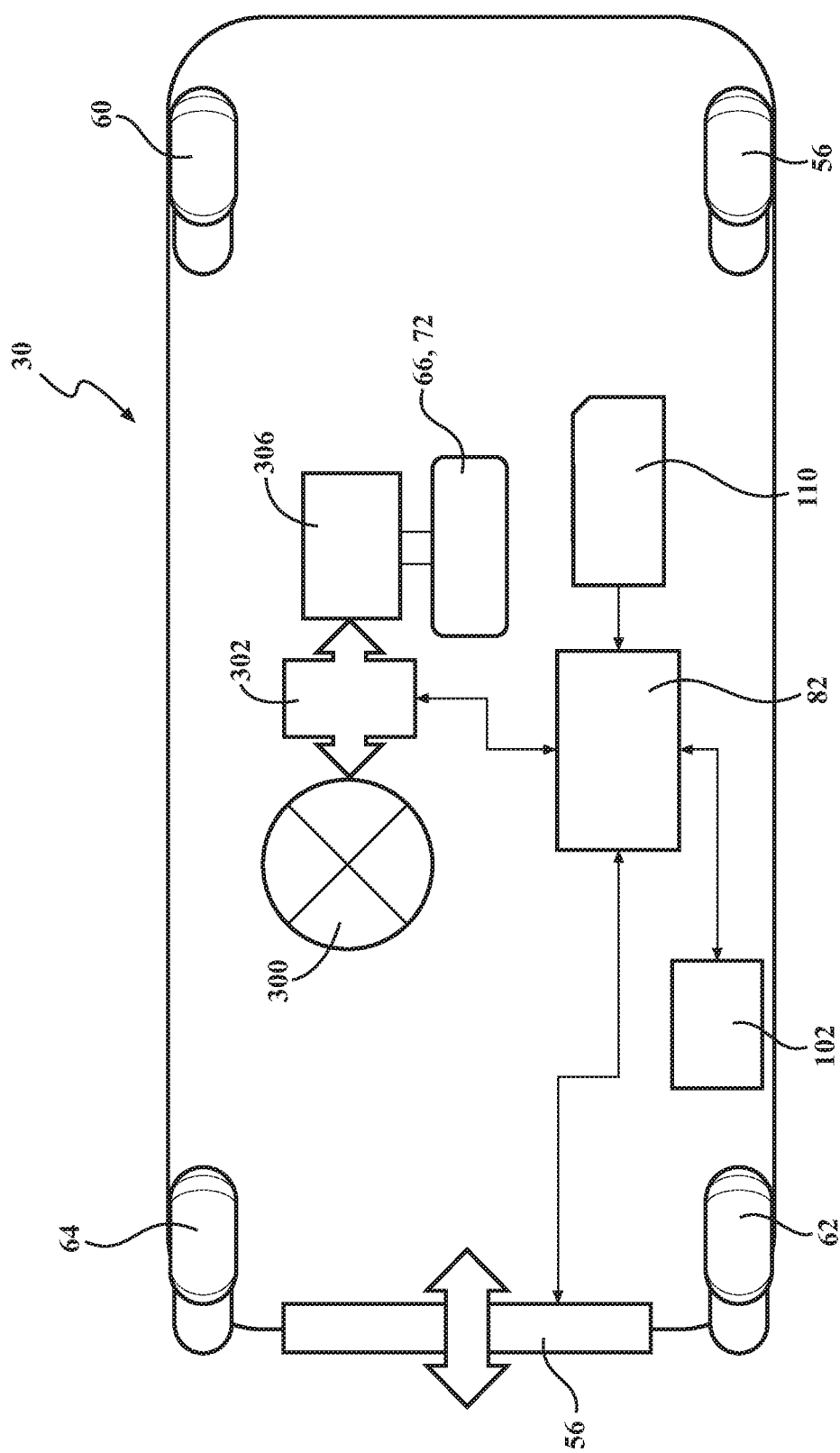
FIG. 12 is a hybrid diagram of components of the patient support apparatus and components of the energy harvesting and release system, and more specifically the system being configured to provide energy harvesting and propulsion assistance to the patient support apparatus using mechanical based devices.

Another embodiment of the patient support apparatus 30 having the energy harvesting and release system 90, and more specifically, releasing harvested energy for propulsion assistance, is shown in FIG. 12. In FIG. 12, the harvesting device 92 and storage device 94 are implemented using mechanical devices. Specifically, the patient support apparatus 30 comprises a spring system 300, a mechanical interface 302, a power transfer module 306 (e.g., for mechanical to electrical or mechanical to mechanical transfer), and the propulsion device 72 (e.g., the drive wheel 66). The mechanical interface 302 is coupled between the spring system 300 and the power transfer module 306. The controller 82 is coupled to and controls the mechanical interface 302. The mechanical interface 302 may comprise any suitable electrical, mechanical or electro-mechanical components for providing selective communication between the power transfer module 306 and the spring system 300. For example, the mechanical interface 302 may be a clock work mechanism to wind the spring, limit the winding of the spring, and control/meter the spring output rate or torque. The spring system 300 may comprise any suitable number and type of spring, such as coil, torsion, compression, extension, leaf springs, and the like. The spring may exhibit variable or constant spring rates.

When energy harvesting is instructed pursuant to determination of the harvesting opportunity condition, the controller 82 selectively actuates or activates the mechanical interface 302 enabling direct mechanical interaction between the power transfer module 306 and the spring system 300. When the drive wheel 66 rotates, vibrates, or otherwise moves, the power transfer module 306 is actuated in a manner gradually causing the springs in the spring system 300 to deform (e.g., compress, twist, extend, bend, etc.), thereby enabling mechanical force to build up in the spring system 300. This build-up of mechanical force corresponds to the harvested energy. The mechanical interface 302 thereafter may be locked to stabilize the harvested mechanical energy for later release.

When propulsion assistance is to be implemented pursuant to determination of the propulsion assist condition, the controller 82 activates or actuates the mechanical interface 302 causing release of the mechanical force stored in the spring system 300. In effect, release of this mechanical force causes reverse actuation of the power transfer module 306, in turn, effecting propulsion of the drive wheel 66. Spring based propulsion assistance and energy harvesting may be implemented in ways other than those described herein and using other components not specifically recited herein.

Referring to back to FIG. 3, the additional aspects regarding user feedback pursuant to the propulsion assistance techniques are described. As previously described, FIG. 3 illustrates the closed-loop regeneration and release of harvested energy as implemented via the generator 98 and propulsion device 72 (e.g., motor). Here, the user applies force to the force sensor 120 to push the patient support apparatus 30, and in turn, providing condition measurements to the controller 82. Various forms of feedback are provided to the user to provide the user with awareness of the effects of the energy harvesting and propulsion assist system 90. First, as shown in FIG. 3, the user may experience tactile feedback resulting from propulsion assisted movement of the wheels 58, 60, 62, 64, 66. In other words, the user is able to physically feel that a boost is being applied to the patient support apparatus 30. Additionally, the controller 82 is configured to output a user visual feedback 400 to the user to indicate a status corresponding to the energy condition. More specifically, the user visual feedback 400 may indicate whether the system 90 has detected or is implementing the harvesting opportunity condition or the propulsion assist condition. Other user visual feedback 400 may include specific results of condition analysis 512, 514, such as how much energy should be or will be harvested or how much boost is being or will be applied. Additionally, user visual feedback 400 may comprise a dynamic gauge, controlled by the controller 82, indicating by which method energy is harvested and how much energy is being or has been harvested, to encourage the user to be conscious of energy harvesting during operation of the patient support apparatus 30. The user visual feedback 400 may be implemented using any suitable method, such as any examples of the UI device 76 described above, or the like. Other types of feedback to the user comprise audible feedback, haptic feedback (e.g., provided at the operator interfaces 56 or handles), and the like.

IV. Advanced Energy Management Techniques

As shown in FIG. 2, the patient support apparatus 30 may optionally comprise a secondary storage component 102. The secondary storage component 102 is of a different type than the storage device 94. In one embodiment, the secondary storage component 102 is a primary battery or rechargeable battery.

The secondary storage component 102 is configured to store and release conventional (non-harvested) energy being previously stored at the time of manufacture of the secondary storage component 102, being previously stored as a result of recharging the secondary storage component 102 from an electric outlet, or provided directly from the electrical outlet. In one example, a plurality of patient support apparatuses 30 may be nested (arranged in-line) providing a continuous connection between secondary storage components 102 of the patient support apparatuses 30. In this scenario, each secondary storage component 102 is a rechargeable battery and the nested group of apparatuses 30 are connected by a single power cord connected between a base unit (charging station) and a patient support apparatus 30 at the proximal (head) end of the line to provide power to the rest of the fleet.

Although the term "secondary" is used to describe the secondary storage component 102, the secondary storage component 102 may be the primary energy supply for the patient support apparatus 30 while the storage device 94 is a back-up energy supply. On the other hand, the storage device 94 may be the primary energy supply while the secondary storage component 102 is a back-up supply of energy.

The controller 82 is coupled to the secondary storage component 102 and may control, receive signals from, send signals to, and otherwise communicate with the secondary storage component 102 using control block 100C and/or 100D.

In some embodiments, the powered device 70 relies entirely upon the harvested energy for power. In other words, the powered device 70 consumes solely the harvested energy from the storage device 94. In other embodiments, the powered device 70 may be powered by the secondary storage component 102 and receive supplemental power from the harvested energy stored in the storage device 94.

For example, in one embodiment, the storage device 94 is configured to store and release solely the harvested energy. Said differently, in this example, the harvested energy is stored only to the storage device 94 and the harvested energy is released only from the storage device 94. Here, the storage device 94 is reserved exclusively for the harvested energy.

In this embodiment, the secondary storage component 102 is configured to store and release solely conventional energy. Here, the conventional energy is stored only on the secondary storage component 102 and the conventional energy is released only from the secondary storage component 102. Thus, in this example, the secondary storage component 102 is reserved exclusively for such conventional energy.

In another embodiment, the storage device 94 stores and releases some harvested energy and some conventional energy while the secondary storage component 102 is reserved exclusively for the conventional energy. In another embodiment, the storage device 94 and the secondary storage component 102 each store and release some harvested energy and some conventional energy.

Accordingly, desire for various ways of managing energy between the storage device 94 and the secondary storage component 102 arise by virtue of the energy storing characteristics, configurations, and interaction between these components.

To manage the aforementioned scenarios, the controller 82 may include an energy management module 600, as shown in FIG. 2. The energy management module 600 is configured to use control blocks 100B, 100C, and/or 100D for managing energy among the storage device 94 and secondary storage components 102. In one embodiment, the energy management module 600 is configured to selectively determine whether to store the harvested energy to the storage device 94 or to the secondary storage component 102. Additionally, or alternatively, the energy management module 600 is configured to determine whether to release (harvested) energy from the storage device 94 or (harvested or conventional) energy from the secondary storage component 102. The energy management module 600 may make determinations other than those described above.

The energy management module 600 may make such determinations depending a plurality of factors, such as a measured self-discharge of the storage device 94 or the secondary storage component 102, a storage capacity of the storage device 94 or the secondary storage component 102, a current charge level of the storage device 94 or the secondary storage component 102, a measured quantity of harvested energy stored in the storage device 94 or the secondary storage component 102, a measured quantity of harvested energy released from the storage device 94 or the secondary storage component 102, and the like.

Another factor used in determinations made by the energy management module 600 may include characteristics of the energy condition determined by the controller 82. For example, assuming the self-discharge of the storage device 94 is high, and the energy condition is the propulsion assist condition, the energy management module 600 may tap into harvested energy from the storage device 94 to satisfy an imminent need for propulsion, knowing that the harvested energy would otherwise be lost from self-discharge. Any other factors may be utilized in making such energy management determinations.

Harvested energy, in some instances, may not be enough to supply energy for performing core functions of the patient support apparatus 30, such as to run motors or charge batteries in a reasonable amount of time. However, certain low power systems or components may be able to utilize the acquired harvested energy efficiently for providing useful functions. These low power systems or components can be on independent energy networks or in addition to the main battery system. These systems or components would be valuable to have on or available during sleep modes, rather than to have them drain the main batteries of the system while on. Various systems of the patient support apparatus 30 that can use energy from energy harvesting include night lights, backlighting, reading light, power indicators during sleep modes, sleep power, battery backup for headwall operation or nurse call interfaces, real time clocks, backup power for alarms, button interfaces, and to charge small batteries or supercapacitors in the system.

The controller 82 may be configured to identify when an operating mode is activated and to release harvested energy upon identification of such modes. For example, harvested energy may be selectively used to power low power systems or components of the patient support apparatus 30 and/or to power sub-systems that need to be powered during sleep modes. Sleep mode may be activated once non-use of the patient support apparatus 30 is detected after a period time. Those skilled in the art appreciate that release of harvested energy may be appropriate for any other operating modes, such as idle modes, standby modes, hibernation modes, and the like. Upon resuming normal operation, the devices may stop receiving harvested energy and instead resume consuming power from the main power source.

In so doing, these techniques can offload energy-draining sources from a main energy storage device of the patient support apparatus 30. This can lengthen battery life for the patient support apparatus 30 and lengthen the amount of time the of the patient support apparatus 30 can operate on battery power.

In other examples, use harvested energy may be advantageous for crash detection applications. For instance, the patient support apparatus 30 (such as a cot) may enter a vehicle, such as an ambulance. When in the vehicle, the patient support apparatus 30 may have limited availability to energy sources provided by the vehicle, and instead, may utilize harvested energy to power sub-systems or components to identify when a vehicle crash occurs. In one example, such components comprise accelerometers that are configured to detect sudden changes in velocity. The accelerometers may be equipped on one or more locations of the patient support apparatus 30. For example, accelerometers may be positioned on, or in, a user interface device of the patient support apparatus 30. Harvested energy may be utilized to power the accelerometers, circuit boards associated with the accelerometers, any other control device for identifying a crash condition, and/or any device that carries out restraint functions if the crash is detected.

Those skilled in the art will appreciate that harvested energy may be utilized during other detectable events or conditions other than those described herein.

It will be further appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The invention claimed is:

1. A patient support apparatus comprising:
   a base;
   a patient support surface supported by said base;
   a powered device;
   an energy harvest and release system comprising:
   a harvesting device being configured to harvest energy;
   a storage device being configured to store and release the harvested energy;
   one or more condition sensors comprising a weight sensor configured to measure a weight applied to said patient support surface; and
   a controller coupled to said harvesting device, said storage device, said one or more condition sensors, and said powered device and with said controller being automated to selectively instruct said harvesting device to harvest energy and to selectively instruct release of the harvested energy from said storage device for consumption by said powered device;
   wherein said controller is configured to instruct said harvesting device to harvest energy in response to determining from said one or more condition sensors that the weight applied to said patient support surface is below a predetermined weight threshold, and/or to instruct release of the harvested energy from said storage device in response to determining from said one or more condition sensors that the weight applied to said patient support surface is above a predetermined weight threshold.

2. The patient support apparatus of claim 1, wherein said one or more condition sensors are configured to generate measurements indicative of a condition of the patient support apparatus;
  wherein said controller is further configured to analyze measurements from said one or more condition sensors to determine an energy condition; and
  wherein said controller is further automated to selectively instruct said harvesting device to harvest energy in response to determining said energy condition to be a harvest opportunity condition and to selectively instruct release of the harvested energy from said storage device for consumption by said powered device in response to determining said energy condition to be an energy demand condition.

3. The patient support apparatus of claim 1, wherein said controller is configured to analyze measurements from said one or more condition sensors to determine at least one of a quantity of energy to harvest with said harvesting device and a quantity of energy to release from said storage device.

4. The patient support apparatus of claim 1, wherein said one or more condition sensors comprise one or more of:
  an accelerometer configured to measure at least one of acceleration of said patient support apparatus, deceleration of said patient support apparatus, and a slope of a surface upon which said patient support apparatus is situated;
  a speed sensor configured to measure a velocity of said patient support apparatus;
  a force sensor configured to measure user applied force to said patient support apparatus; and
  a demand sensor configured to measure a power demand of said powered device.

5. The patient support apparatus of claim 1, wherein said controller is configured to instruct said harvesting device to harvest energy in response to determining from said one or more condition sensors that a slope of a surface upon which said patient support apparatus is situated is flat or declined.

6. The patient support apparatus of claim 1, wherein said controller is configured to instruct said harvesting device to harvest energy in response to determining from said one or more condition sensors that said patient support apparatus is decelerating.

7. The patient support apparatus of claim 1, wherein said controller is configured to instruct said harvesting device to harvest energy in response to determining from said one or more condition sensors that a velocity of said patient support apparatus is constant and/or above a predetermined velocity threshold.

8. The patient support apparatus of claim 1, wherein said controller is configured to instruct said harvesting device to harvest energy in response to determining from said one or more condition sensors that a user applied force to said patient support apparatus is below a predetermined force threshold.

9. The patient support apparatus of claim 1, wherein said controller is configured to instruct said harvesting device to harvest energy in response to determining from said one or more condition sensors that a power demand of said powered device is below a predetermined power demand threshold.

10. The patient support apparatus of claim 1, wherein said controller is configured to instruct release of the harvested energy from said storage device in response to determining from said one or more condition sensors that a slope of a surface upon which said patient support apparatus is situated is inclined.

11. The patient support apparatus of claim 1, wherein said controller is configured to instruct release of the harvested energy from said storage device in response to determining from said one or more condition sensors that said patient support apparatus is accelerating.

12. The patient support apparatus of claim 1, wherein said controller is configured to instruct release of the harvested energy from said storage device in response to determining from said one or more condition sensors that a velocity of said patient support apparatus is below a predetermined velocity threshold.

13. The patient support apparatus of claim 1, wherein said controller is configured to instruct release of the harvested energy from said storage device in response to determining from said one or more condition sensors that a user applied force to said patient support apparatus is above a predetermined force threshold.

14. The patient support apparatus of claim 1, wherein said controller is configured to instruct release of the harvested energy from said storage device in response to determining from said one or more condition sensors that a power demand of said powered device is above a predetermined demand threshold.

15. The patient support apparatus of claim 1, wherein said powered device comprises one or more of:
  a propulsion device configured to assist in movement of said patient support apparatus;
  an electronic scale configured to measure a weight applied to said patient support surface;
  an electronic sensor employed by said patient support apparatus;
  a user interface device employed by said patient support apparatus; and
  a communication device employed by said patient support apparatus.

16. The patient support apparatus of claim 1, wherein said harvesting device comprises one or more of:
  a rotational generator configured to harvest energy from movement of one or more wheels of said patient support apparatus;
  a regenerative braking device configured to harvest energy absorbed by a braking system of said patient support apparatus;
  photovoltaic cells configured to harvest energy from light surrounding said patient support apparatus;
  a piezoelectric generator configured to harvest energy from mechanical stress applied to one or more components of said patient support apparatus;
  a capacitive generator configured to harvest energy from vibrations applied to one or more components of said patient support apparatus; and
  an electromagnetic induction generator configured to harvest energy from vibrations applied to one or more components of said patient support apparatus.

17. The patient support apparatus of claim 1, wherein said storage device comprises one or more of a mechanical storage device, an electrical storage device, and an electrochemical storage device.

18. The patient support apparatus of claim 1, further comprising a secondary storage component being of a different type than said storage device and wherein said controller is coupled to said secondary storage component, wherein said controller is configured to selectively determine at least one of whether to store the harvested energy to said storage device or said secondary storage component and whether to release energy from said storage device or said secondary storage component depending on at least one of:

a measured self-discharge of one or more of said storage device and said secondary storage component;

a storage capacity of one or more of said storage device and said secondary storage component;

a current charge level of one or more of said storage device and said secondary storage component;

a measured quantity of harvested energy stored in one or more of said storage device and said secondary storage component; and a measured quantity of harvested energy released from one or more of said storage device and said secondary storage component.

19. The patient support apparatus of claim 1, wherein said storage device is configured to store and release solely the harvested energy and wherein said powered device is configured to consume solely the harvested energy.

20. The patient support apparatus of claim 1, wherein said powered device comprises an accelerometer and said controller is configured to release the harvested energy from said storage device for consumption by said accelerometer so that said accelerometer is operational to identify a crash condition based on changes in velocity of the patient support apparatus.

* * * * *